US009376574B2

(12) United States Patent
Hayashi et al.

(10) Patent No.: US 9,376,574 B2
(45) Date of Patent: Jun. 28, 2016

(54) METHOD FOR FORMING MULTILAYER COATING FILMS WHEREIN THE BASECOAT FILM COMPRISES ACRYLIC, POLYESTER AND MELAMINE RESINS, CARBODIIMIDE AND URETHANE THICKENERS

(75) Inventors: Kouki Hayashi, Aichi (JP); Daichi Kato, Aichi (JP); Junya Ogawa, Aichi (JP)

(73) Assignees: NIPPON PAINT CO., LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 1118 days.

(21) Appl. No.: 12/989,157

(22) PCT Filed: Apr. 21, 2009

(86) PCT No.: PCT/JP2009/058228
§ 371 (c)(1),
(2), (4) Date: Jan. 10, 2011

(87) PCT Pub. No.: WO2009/131234
PCT Pub. Date: Oct. 29, 2009

(65) Prior Publication Data
US 2011/0108426 A1 May 12, 2011

(30) Foreign Application Priority Data

Apr. 22, 2008 (JP) ................. 2008-111302

(51) Int. Cl.
*C09D 5/03* (2006.01)
*C08F 257/02* (2006.01)
*B05D 7/00* (2006.01)

(52) U.S. Cl.
CPC .............. *C09D 5/037* (2013.01); *C08F 257/02* (2013.01); *B05D 7/00* (2013.01)

(58) Field of Classification Search
None
See application file for complete search history.

(56) References Cited

U.S. PATENT DOCUMENTS

| 2002/0132934 A1* | 9/2002 | Huynh-Ba ......... C08G 18/3271 525/453 |
| 2004/0028823 A1* | 2/2004 | Dutt ............................ 427/385.5 |
| 2004/0053056 A1* | 3/2004 | Rardon ................ C08G 18/706 428/423.1 |
| 2007/0286959 A1 | 12/2007 | Palmer |
| 2009/0041942 A1* | 2/2009 | Hayashi et al. ............ 427/385.5 |

FOREIGN PATENT DOCUMENTS

| EP | 1 908 807 | 4/2008 |
| JP | 2003-105257 | 4/2003 |

(Continued)

OTHER PUBLICATIONS

International Search Report issued Jul. 16, 2009 in International (PCT) Application No. PCT/JP2009/058228.
Full English translation of JP 2003-105257, published Apr. 9, 2003.
Full English translation of JP 2003-251264, published Sep. 9, 2003.
Full English translation of JP 2003-251275, published Sep. 9, 2003.
Full English translation of JP 2003-251276, published Sep. 9, 2003.

*Primary Examiner* — Francisco Tschen
(74) *Attorney, Agent, or Firm* — Wenderoth, Lind & Ponack, L.L.P.

(57) ABSTRACT

The present invention relates to a method for producing a multilayer coating film, which comprises steps of applying a waterborne intermediate coating composition on an electrodeposited coating film to form an intermediate coating film; applying a waterborne base coating composition on the intermediate coating film to form a base coating film; applying a clear coating composition on the base coating film to form a clear coating film; and simultaneously baking and curing the intermediate coating film, the base coating film applied thereon, and the clear coating film further applied thereon in order to form a multilayer coating film, wherein the waterborne intermediate coating composition comprises an emulsion of a hydroxyl group-containing acrylic resin comprising 27 to 65% by weight of a styrene monomer, wherein the emulsion has a water-tolerance within a range of from 0.2 to 5 and a hexane-tolerance within a range of from 5 to 25; a hydroxyl group-containing polyester resin; a melamine resin; a carbodiimide; and an associative thickener, wherein the associative thickener comprises an urethane compound (A) represented by the formula (1), and an urethane compound (B) represented by the formula (2): R—(OA)$_m$—O—C(=O)—NH—Y—NH—C(=O)—O-(AO)$_n$—R (1) R—(OA)$_a$-[O—C(=O)—NH—Y—NH—C(=O)—(OA)$_b$]$_c$-O—C(=O)—NH—Y—NH—C(=O)—O-(AO)$_d$—R (2) wherein R independently represents a hydrocarbon group having 8 to 24 carbon atoms, Y independently represents a residue resulted from a removal of two isocyanate groups from a diisocyanate, OA independently represents an oxyalkylene group having 2 to 4 carbon atoms, AO independently represents an alkyleneoxy group having 2 to 4 carbon atoms, O represents an oxygen atom, C represents a carbon atom, N represents a nitrogen atom, m independently represents an integer of 20 to 500, n independently represents an integer of 20 to 500, a independently represents an integer of 1 to 100, d independently represents an integer of 1 to 100, b represents an integer of 40 to 500, c represents an integer of 1 to 5, b by c (or b×c) represents an integer of 150 to 2500, and R may be the same or different, and Y may be the same or different, wherein each of the urethane compounds (A) and (B) has at least 80% by weight of oxyethylene groups and ethyleneoxy groups relative to the total weight of the oxyalkylene groups and the alkyleneoxy groups, wherein weight ratio of the hydroxyl group-containing acrylic resin emulsion to the associative thickener is within a range of from 100/0.1 to 100/50 as a basis of the solid content, in order to provide the multilayer coating film with an excellent exterior appearance by a three coating and one baking (3C1B) procedure, wherein viscosity of the intermediate coating composition is controlled, and furthermore, ratio of hydrophilicity to hydrophobicity of the resin in the intermediate coating composition is controlled, in order to significantly suppress sagging of the waterborne intermediate coating composition during the coating procedure.

7 Claims, No Drawings

(56) References Cited

FOREIGN PATENT DOCUMENTS

| JP | 2003-251264 | 9/2003 |
| JP | 2003-251275 | 9/2003 |
| JP | 2003-251276 | 9/2003 |
| WO | 2004/099327 | 11/2004 |
| WO | 2007/013558 | 2/2007 |
| WO | 2007/108905 | 9/2007 |

* cited by examiner

US 9,376,574 B2

METHOD FOR FORMING MULTILAYER COATING FILMS WHEREIN THE BASECOAT FILM COMPRISES ACRYLIC, POLYESTER AND MELAMINE RESINS, CARBODIIMIDE AND URETHANE THICKENERS

TECHNICAL FIELD

The present invention relates to a method for producing a multilayer coating film, particularly relates to a method for producing a multilayer coating film comprising an intermediate coating film, a base coating film and a clear coating film, which can be applied on a vehicle body such as an automobile by a three coating and one baking (3C1B) procedure.

BACKGROUND ART

Generally, coatings on a vehicle body such as an automobile can be formed, for example, by applying an electrodeposited coating film on a steel panel as a substrate, an intermediate coating film thereon, and a top coating film comprising a base coating filth and a clear coating film in this order. Conventionally, each coating film has been developed depending on the required properties and functions. The coating composition to form the desired coating film is prepared, and then applied. Herein, the applied coating film is baked and cured before a further application of a coating film thereon. If some kinds of coating compositions are applied in a certain order, the underlying coating film should be completely finished and smoothed before applying a further coating composition thereon. If not so, adjacent two coating layers adversely effect on each other. The rough surface of the unfinished underlying coating film protrudes on the further applied overlying coating film, and then the resulting multilayer coating film has a deteriorated exterior appearance.

In recent years, in the field of coatings on vehicle bodies such as automobiles, there is coming a method for producing a multilayer coating film comprising steps of applying a coating composition on an uncured coating film, and then simultaneously curing them, in order to obtain more workable efficacy and realize reduced energy to be used, which is especially demanded in recent years, such as a three coating and one baking (3C1B) procedure comprising a step of simultaneously baking and curing an intermediate coating film, a base coating film and a clear coating film, etc.

Furthermore, during such coating procedure such as a three coating and one baking (3C1B) procedure, wherein a coating composition is continuously applied on an uncured intermediate coating film, if the initially applied intermediate coating composition is sagged, the resulting coating film has a significantly deteriorated exterior appearance. Accordingly, there is a large demand on art to suppress sagging of the applied intermediate coating composition during the coating procedure in this field.

JP-A-2003-105257 (patent literature 1) discloses a waterborne intermediate coating composition comprising a carboxyl group-containing waterborne polyester resin and a melamine resin, which can provide a good hiding ability relative to the underlying coating film and a good smoothness of the resulting coating film. The patent literature 1 discloses a method for producing a multilayer coating film comprising steps of applying the waterborne intermediate coating composition to from an intermediate coating film, and baking and curing the intermediate coating film to form a cured intermediate coating film, and then, subsequently, applying a top coating composition thereon, and heating and curing it to give a multilayer coating film. Therefore, the patent literature 1 does not disclose application of the waterborne intermediate coating composition to any three coating and one baking (3C1B) procedure. Although the patent literature 1 discloses that the waterborne intermediate coating composition has been developed, in detail, in order to provide a good hiding ability relative to the underlying coating film and a good smoothness of the resulting intermediate coating film, a waterborne intermediate coating composition applicable to the 3C1B procedure is not investigated in the patent literature 1 wherein the waterborne intermediate coating composition is baked and cured after its application. Therefore, sagging of the applied waterborne intermediate coating composition during the 3C1B procedure is not improved in the patent literature 1 at all.

JP-A-2003-251264 (patent literature 2) discloses a method for producing a multilayer coating film, by a three coating and one baking (3C1B) procedure, which comprises a step of simultaneously heating and curing an intermediate coating film, a base coating film thereon, and a clear coating film thereon, which can reduce miscibility between the intermediate coating film and the base coating film, and provide a multilayer coating film having an excellent exterior appearance without yellowing. The patent literature 2 only discloses sagging of the intermediate coating film of the applied intermediate coating composition during the 3C1B procedure is suppressed by controlling viscosity of the intermediate coating film at a given shear rate.

JP-A-2003-251275 (patent literature 3) discloses a method for producing a multilayer coating film, by a three coating and one baking (3C1B) procedure, which comprises a step of simultaneously heating and curing an intermediate coating film, a base coating film thereon, and a clear coating film thereon, wherein used is a waterborne intermediate coating composition having an improved viscosity, which can provide a coating film with an excellent exterior appearance. The patent literature 3 discloses, in order to form the intermediate coating film, a waterborne intermediate coating composition comprising an acrylic emulsion resin, a melamine resin, a pigment-dispersed paste with a dispersing agent, and thickener. The patent literature 3 discloses, as the preferable thickener, a specific urethane associative thickener in order to improve viscosity of the coating composition, and therefore, which can suppress sagging of the applied coating composition during the coating procedure.

JP-A-2003-251276 (patent literature 4) discloses a method for producing a multilayer coating composition, by a three coating and one baling (3C1B) procedure, which comprises a step of simultaneously heating and curing an intermediate coating film, a base coating film thereon and a clear coating film thereon, which can provide the resulting coating film with an excellent chipping resistance, an excellent impact resistance, and an excellent exterior appearance. The patent literature 4 discloses sagging of the applied waterborne intermediate coating composition during the coating procedure can be suppressed by only adding a specific thickener or controlling thickness of the dried intermediate coating film.

WO 2007/013558 (patent literature 5) discloses an addition of a specific viscosity improving agent to a waterborne metallic color base coating composition in order to improve flip-flop (FF) property of the luster color pigment contained therein. The patent literature 5 only discloses a two coating and one baking (2C1B) procedure comprising steps of applying the waterborne metallic color base coating composition, and applying a clear coating composition thereon. The patent literature 5 does not disclose a coating procedure comprising any three coating and one baking (3C1B) procedure. The patent literature 5 does not disclose such specific viscosity improving agent is added to any intermediate coating composition.

CITATION LIST

Patent Literature

PTL 1: JP-A-2003-105257
PTL 2: JP-A-2003-251264
PTL 3: JP-A-2003-251275
PTL 4: JP-A-2003-251276
PTL 5: WO 2007/013558

SUMMARY OF INVENTION

Technical Problem

Problems in the prior arts to be solved by the present invention consist in provision of a multilayer coating film with an excellent exterior appearance by a three coating and one baking (3C1B) procedure, wherein viscosity of an intermediate coating composition is controlled, and furthermore, ratio of hydrophilicity to hydrophobicity of resin in the intermediate coating composition is controlled, in order to significantly suppress sagging of the waterborne intermediate coating composition during the coating procedure.

Solution to Problem

The present inventors intensively investigated with respect to these problems in the prior arts, and found that, in a three coating and one baking (3C1B) procedure comprising a step of simultaneously baking and curing an intermediate coating film, a base coating film thereon and a clear coating film thereon, a waterborne intermediate coating composition to form the intermediate coating film, which comprises a specific hydroxyl group-containing acrylic resin emulsion, a hydroxyl group-containing polyester resin, a melamine resin, a carbodiimide and a specific associative thickener, wherein the hydroxyl group-containing acrylic resin in the emulsion contains 27 to 65% by weight of a styrene monomer, could significantly suppress sagging of the waterborne intermediate coating composition during the coating procedure. Accordingly, the present invention provides the followings.

A method for producing a multilayer coating film, which comprises steps of
applying a waterborne intermediate coating composition on an electrodeposited coating film to form an intermediate coating film;
applying a waterborne base coating composition on the intermediate coating film to form a base coating film;
applying a clear coating composition on the base coating film to form a clear coating film; and
simultaneously baking and curing the intermediate coating film, the base coating film applied thereon, and the clear coating film further applied thereon in order to form a multilayer coating film,
wherein the waterborne intermediate coating composition comprises
an emulsion of a hydroxyl group-containing acrylic resin comprising 27 to 65% by weight of a styrene monomer, wherein, the emulsion has a water-tolerance within a range of from 0.2 to 5 and a hexane-tolerance within a range of from 5 to 25;
a hydroxyl group-containing polyester resin;
a melamine resin;
a carbodiimide; and
an associative thickener,
wherein the associative thickener comprises an urethane compound (A) represented by the formula (1), and an urethane compound (B) represented by the formula (2):

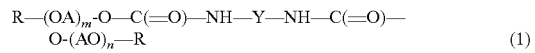

(1)

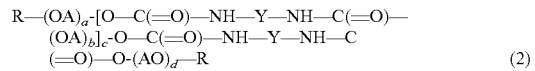

(2)

wherein
R independently represents a hydrocarbon group having 8 to 24 carbon atoms,
Y independently represents a residue resulted from a removal of two isocyanate groups from a diisocyanate,
OA independently represents an oxyalkylene group having 2 to 4 carbon atoms,
AO independently represents an alkyleneoxy group having 2 to 4 carbon atoms,
O represents an oxygen atom,
C represents a carbon atom,
N represents a nitrogen atom,
m independently represents an integer of 20 to 500,
n independently represents an integer of 20 to 500,
a independently represents an integer of 1 to 100,
d independently represents an integer of 1 to 100,
b represents an integer of 40 to 500,
c represents an integer of 1 to 5,
b by c (or b×c) represents an integer of 150 to 2500, and
R may be the same or different, and Y may be the same or different,
wherein each of the urethane compounds (A) and (B) has at least 80% by weight of oxyethylene groups and ethyleneoxy groups relative to the total weight of the oxyalkylene groups and the alkyleneoxy groups,
wherein weight ratio of the hydroxyl group-containing acrylic resin emulsion to the associative thickener is within a range of from 100/0.1 to 100/50 as a basis of the solid content.

In the preferable embodiment of the above-described method for producing the multilayer coating film, the weight ratio of the hydroxyl group-containing acrylic resin emulsion to the associative thickener is within a range of from 100/1 to 100/10 as a basis of the solid content.

In the more preferable embodiment of the above-described method for producing the multilayer coating film, the hydroxyl group-containing acrylic resin in the emulsion has a glass transition temperature (Tg) within a range of from −10 to 40° C., an acid value within a range of from 3 to 50 mgKOH/g, and a hydroxyl value within a range of from 5 to 80 mgKOH/g.

In the yet more preferable embodiment of the above-described method for producing the multilayer coating film, the waterborne intermediate coating composition comprises 5 to 70% by weight of the hydroxyl group-containing polyester resin, 1 to 30% by weight of the hydroxyl group-containing acrylic resin emulsion, 10 to 40% by weight of the melamine resin, and 0.05 to 2% by weight of the associative thickener.

In addition, the present invention relates to a multilayer coating film obtained/obtainable by the above-described method.

Advantageous Effects of Invention

According to the present invention, in the coating method comprising a three coating and one baking (3C1B) procedure, controlling the content of the styrene monomer in the hydroxyl group-containing acrylic resin in the waterborne intermediate coating composition can balance the ratio of hydrophilicity (e.g., water-tolerance) to hydrophobicity (e.g., hexane-tolerance) in the acrylic resin. It can significantly suppress sagging of the waterborne intermediate coating composition comprising a carbodiimide and an associative thickener during the coating procedure, and provide a multilayer coating film with an excellent exterior appearance.

DESCRIPTION OF EMBODIMENTS

Best Mode for Carrying Out the Invention

Detailed Description of the Invention

Hereinafter, the present invention is described in detail. Initially described are the waterborne intermediate coating composition, the waterborne base coating composition, and the clear coating composition, all of which can be employed in the present invention. Subsequently, the method for producing the multilayer coating film is described in detail.

Waterborne Intermediate Coating Composition

The waterborne intermediate coating composition which can be used in the method according to the present invention comprises a hydroxyl group-containing acrylic resin emulsion, a hydroxyl group-containing polyester resin, a melamine resin, a carbodiimide and an associative thickener, all of which are dispersed or dissolved in an aqueous medium. The waterborne intermediate coating composition may further comprise a pigment(s), an additive(s) suitable to the conventional waterborne intermediate coating composition for coating vehicle bodies such as automobiles, etc.

Hydroxyl Group-Containing Acrylic Resin Emulsion

The hydroxyl group-containing acrylic resin emulsion can be prepared by an emulsion polymerization of a monomer mixture comprising (a) an alkyl(meth)acrylate, (b) an acid group-containing ethylenically unsaturated monomer, (c) a hydroxyl group-containing ethylenically unsaturated monomer, and a styrene monomer as an essential monomer. Each component of the monomer mixture is exemplary described hereinafter in detail. Each component may be a singular compound or in an appropriate combination of two or more compounds.

The styrene monomer contained in the acryl resin of the emulsion has a hydrophobicity, which can significantly suppress sagging of the resulting waterborne intermediate coating composition during the coating procedure therewith.

The styrene monomer includes, for example, styrene, α-methyl styrene, α-methyl styrene dimer, vinyl toluene, divinyl benzene, etc. Among others, styrene is particularly preferable from the aspects of its hydrophobicity, cost, availability, etc.

Content of the styrene monomer is within a range of from 27 to 65% by weight, preferably within a range of from 30 to 55% by weight, and more preferably within a range of from 32 to 50% by weight, relative to total weight of the monomers for preparation of the acrylic resin of the emulsion. When the content of the styrene monomer is less than 27% by weight, the resulting waterborne intermediate coating composition may have an insufficient hydrophobicity, and therefore sag during the coating procedure therewith. When the content of the styrene monomer is more than 65% by weight, the resulting waterborne intermediate coating composition may provide the resulting intermediate coating film with inferior properties.

The acrylic resin in the emulsion contains the styrene monomer in the above-defined range, which can adjust water-tolerance of the emulsion within a range of from 0.2 to 5 (mL), and preferably within a range of from 0.3 to 4 (mL), and which can adjust hexane-tolerance of the emulsion within a range of from 5 to 25 (mL), and preferably within a range of from 6 to 23 (mL). Herein, the "water-tolerance" is an index of hydrophilicity. A higher water-tolerance means a higher hydrophilicity. Herein, the "hexane-tolerance" is an index of hydrophobicity. A higher hexane-tolerance means a higher hydrophobicity.

When the water-tolerance is less than 0.2 (mL), the resulting coating composition may have a decreased compatibility, and therefore, the resulting coating film therewith may be hazy or may have a deteriorated exterior appearance. When the water-tolerance is more than 5 (mL), water-resistance may be decreased. Therefore, in the case of the water-tolerance falls within the above-defined range, the resulting waterborne intermediate coating composition has an improved storage stability and an improved application workability.

When the hexane-tolerance is less than 5 (mL), the resulting coating composition may have a decreased compatibility, and therefore, the resulting coating film therewith may be hazy or may have a deteriorated exterior appearance. When the hexane-tolerance is more than 25 (mL), the resulting coating composition has a decreased compatibility, and therefore, in this case, the resulting waterborne intermediate coating composition may have deteriorated properties such as decreased storage stability.

Herein, the water-tolerance can be determined by the following measurement. At a specified measuring temperature: 20° C., 0.5 g of an object resin/emulsion is weighted in a 100 mL beaker. 10 mL of acetone is added thereto with a whole pipette. The resin/emulsion is dissolved in acetone on a magnetic stirrer to give an acetone solution. Subsequently, the acetone solution is titrated with deionized water with a 50 mL biuret. When the acetone solution is hazed, the amount of the added deionized water is recorded. The amount (mL) is a value of the water-tolerance. The hexane-tolerance can be determined by using n-hexane instead of the deionized water in the above-described determination of the water-tolerance. Herein, the amount of the added n-hexane (mL) which hazed the acetone solution is a value of the hexane-tolerance.

The hydroxyl group-containing acrylic resin emulsion which can be used in the present invention is preferably an emulsion of a hydroxyl group-containing acrylic resin comprising 27 to 65% by weight of the styrene monomer, which has the water-tolerance (mL) within a range of from 0.2 to 5 and the hexane-tolerance (mL) within a range of from 5 to 25. Such hydroxyl group-containing acrylic resin can significantly suppress sagging of the resulting waterborne intermediate coating composition during the coating procedure therewith, and improve exterior appearance of the resulting coating film.

The alkyl(meth)acrylate (a) can form a backbone of the acrylic resin in the emulsion. The alkyl(meth)acrylate (a) includes, for example, methyl(meth)acrylate, ethyl(meth) acrylate, propyl(meth)acrylate, n-butyl(meth)acrylate, isobutyl(meth)acrylate, t-butyl(meth)acrylate, hexyl(meth)acrylate, 2-ethylhexyl(meth)acrylate, octyl(meth)acrylate, nonyl (meth)acrylate, decyl(meth)acrylate, dodecyl(meth)acrylate, stearyl(meth)acrylate, etc.

The acid group-containing ethylenically unsaturated monomer (b) can improve stabilities of the resulting acrylic resin emulsion, such as storage stability, mechanical stability and anti-freezing stability, which can improve reactivity in curing between the acrylic resin and the curing agent such as a melamine resin during the formation of the coating film. Preferably, the acid group includes a carboxylic acid group, sulfonic acid group, phosphoric acid group, etc. Particularly preferable acid group is a carboxylic acid group from the aspects of improving the stabilities and the curing reaction, etc.

The carboxylic acid group-containing ethylenically unsaturated monomer includes, for example, acrylic acid, methacrylic acid, crotonic acid, isocrotonic acid, ethacrynic acid, propyl acrylic acid, isopropyl acrylic acid, itaconic acid, maleic anhydride, fumaric acid, etc. The sulfonic acid group-containing ethylenically unsaturated monomer includes, for example, p-vinyl benzene sulfonic acid, p-acrylamide propane sulfonic acid, t-butyl acrylamide sulfonic acid, etc. The phosphoric acid group-containing ethylenically unsaturated monomer includes, for example, LIGHT-ESTER PM (produced by KYOEISHA CHEMICAL Co., LTD.), such as monophosphate of 2-hydroxyethyl acrylate, monophosphate of 2-hydroxypropyl methacrylate, etc.

The hydroxyl group-containing ethylenically unsaturated monomer (c) can provide the resulting acrylic resin emulsion with a hydrophilicity due to the hydroxyl group therein. The resulting acrylic resin emulsion can improve its application workability and anti-freezing stability of the resulting coating composition containing the emulsion, and provide the resulting resin emulsion with a curing reactivity to the curing agent such as melamine resin, isocyanate or the like.

The hydroxyl group-containing ethylenically unsaturated monomer (c) includes, for example, 2-hydroxyethyl(meth) acrylate, 2-hydroxypropyl(meth)acrylate, 4-hydroxybutyl (meth)acrylate, ε-caprolactone-modified acrylic monomer, etc.

The ε-caprolactone-modified acrylic monomer includes, for example, "Placcel FA-1", "Placcel FA-2", "Placcel FA-3", "Placcel FA-4", "Placcel FA-5", "Placcel FM-1", "Placcel FM-2", "Placcel FM-3", "Placcel FM-4" and "Placcel FM-5", which are produced by DAICEL CHEMICAL INDUSTRIES, LTD, etc.

The monomer mixture may further comprise, as an additional component, at least one monomer selected from the group consisting of (meth)acrylonitriles and (meth)acrylamides.

Herein, the monomer mixture may further comprise a crosslinkable monomer such as a carbonyl group-containing ethylenically unsaturated monomer, a hydrolyzable and polymerizable silyl group-containing monomer, a polyfunctional vinyl monomer, etc. The resulting acrylic resin emulsion therewith is a self-crosslinkable.

The emulsion polymerization can be carried out, in the presence of a radical polymerization initiator and an emulsifier, by heating the above-described monomer mixture in an aqueous medium with stirring. For example, reaction temperature is preferably within a range of from about 30 to about 100° C., and reaction time is preferably within a range of from about 1 to about 10 hours. The reaction temperature can be controlled by adding dropwise a portion or whole of the monomer mixture or the pre-emulsified monomer mixture into a reaction vessel containing water and an emulsifier.

The radical polymerization initiator includes a known initiator for an emulsion polymerization to prepare a conventional acrylic resin. The initiator includes, for example, a water-soluble free radical polymerization initiator such as a persulfate such as potassium persulfate, sodium persulfate, ammonium persulfate, for example, in an aqueous solution, etc. The initiator includes, for example, in an aqueous solution, a so-called redox initiator in a combination of an oxidizing agent, such as potassium persulfate, sodium persulfate, ammonium persulfate and hydrogen peroxide, and an reducing agent, such as sodium hydrogensulfite, sodium thiosulfate, Rongalit and ascrobic acid.

The emulsifier includes an anionic or nonionic emulsifier selected from micelle compounds, each of which has a hydrocarbon group having 6 or more of carbon atoms and a hydrophilic moiety, such as a carboxylate, a sulfonate or a sulfuric acid partial ester, in one molecule. The anionic emulsifier includes an alkaline metal salt or an ammonium salt of a half ester of sulfuric acid with an alkyl phenol or a fatty alcohol; an alkaline metal salt or an ammonium salt of an alkyl sulfonate or an allyl sulfonate; an alkaline metal salt or an ammonium salt of a half ester of sulfuric acid with a polyoxyethylene alkylphenyl ether, a polyoxyethylene alkyl ether or a polyoxyethylene allyl ether, etc. The nonionic emulsifier includes a polyoxyethylene alkylphenyl ether, a polyoxyethylene alkyl ether, a polyoxyethylene allyl ether, etc. The emulsifier includes, in addition to these conventional anionic and nonionic emulsifiers, various anionic and nonionic reactive emulsifiers, each of which has, in its molecule, a radically polymerizable unsaturated double bond-containing group, such as an acrylic group, a methacrylic group, a propenyl group, an allyl group, an allyl ether group, a maleic group, etc. An appropriate single emulsifier may be used alone, or two or more emulsifiers may be used in an appropriate combination.

Herein, during the emulsion polymerization, preferably, an auxiliary agent in order to control the molecular weight is appropriately used depending on the polymerization conditions, i.e., chain transfer agent, such as a mercaptan compound and a lower alcohol, which can accelerate the emulsion polymerization, accelerate the formation of the resulting coating film with a smooth and uniform surface, and improve an adherence to the substrate.

Herein, the emulsion polymerization includes any conventional polymerization, such as a polymerization including a continuous uniform addition of a monomer at a single stage; a core-shell polymerization including a multi-stage monomer feeding; a power feed polymerization wherein formulation of the monomers to be fed is continuously altered during the polymerization, etc.

The above-described emulsion polymerization can provide the hydroxyl group-containing acrylic resin emulsion which can be used in the present invention. Weight average molecular weight of the resulting acrylic resin is generally, but is not particularly limited to, a range of from about 50000 to about 1000000, and a preferable range of from about 100000 to about 800000.

Glass transition temperature (Tg) of the above-described acrylic resin is within a range of from −10 to 40° C., preferably within a range of from −7 to 35° C., and more preferably within a range of from −5 to 30° C. Tg of the resin within the above-defined range can provide the waterborne intermediate coating composition comprising such acrylic resin emulsion, which is used in a wet-on-wet coating procedure, with an excellent affinity and adherence between the applied coating composition and the further applied overlying coating composition. Therefore, it can provide an improved miscibility between the applied waterborne intermediate coating composition in wet and the further applied overlaying coating composition thereon in wet, and do not provide any inversion between them. It can provide the finally resulting multilayered coating film with an appropriate flexibility or an improved chipping resistance. As a result, a multilayer coating film with an excellent exterior appearance can be formed. When Tg of the resin is less than −10° C., the resulting coating film may have an inferior mechanical strength or an inferior chipping resistance. On the other hand, when Tg of the resin is more than 40° C., the resulting coating film may be hardened and brittle, and therefore the resulting coating film may have an inferior impact resistance or an inferior chipping resistance. Species and content of the monomer can be determined to adjust the Tg of the resin within the above-defined range.

Acid value of the acrylic resin is within a range of from 3 to 50 mgKOH/g, and preferably within a range of from 5 to 30 mgKOH/g. The resin having such defined acid value can provide both of the emulsion containing the resin and the waterborne intermediate coating composition containing the emulsion with improves stabilities such as a storage stability, a mechanical stability, an anti-freezing stability, etc. The resin can sufficiently react with a curing agent such as a melamine resin during the formation of the coating film to provide the resulting coating film with strength, chipping resistance, water resistance, etc. When the acid value of the resin is less than 3 mgKOH/g, the above-described stabilities may be decreased, and therefore, it may provide the reaction between the resin and the curing agent such as the melamine resin with insufficiency, or the resulting coating film may have an inferior the strength, an inferior chipping resistance and an inferior water resistance. On the other hand, when the acid value of the resin is more than 50 mgKOH/g, the resin may have an inferior polymerization stability, the emulsion containing the resin and the waterborne intermediate coating composition containing the emulsion may have inferior stabilities, or the resulting coating film may have an inferior water resistance. Species and content of the monomer can be determined to adjust the acid value of the resin within the above-defined range. As described above, it is desirable that the acid group-containing ethylenically unsaturated monomer (b) comprises the carboxylic acid group-containing monomer. It is preferable that the monomer (b) comprises preferably no less than 50% by weight, and more preferably no less than 80% by weight of the carboxylic acid group-containing monomer relative to the total weight of the monomer (b).

Hydroxyl value of the acrylic resin is within a range of from 5 to 80 mgKOH/g, and preferably within a range of from 10 to 70 mgKOH/g. The resin having such defined hydroxyl value has an appropriate hydrophilicity, and therefore, the resin can provide the resulting coating composition containing the emulsion of the resin with an improved application workability and an improved anti-freezing stability, and the curing reactivity of the resin with a curing agent such as a melamine resin and an isocyanate is sufficient. When the hydroxyl value is less than 5 mgKOH/g, the curing reactivity of the resin with the curing agent may be insufficient, or the resulting coating film may have inferior mechanical properties, an inferior chipping resistance, an inferior water resistance and an inferior solvent resistance. On the other hand, when the hydroxyl value is more than 80 mgKOH/g, the resulting coating film may have an inferior water resistance, or the resin may have an inferior compatibility to the curing agent. Therefore, in this case, the resulting coating film may have a disturbance, and the curing reaction may ununiformly take place, as a result, which may provide the resulting coating film with inferior strengths, particularly an inferior chipping resistance, and an inferior resistance to solvent or water. Species and content of the monomer can be determined to adjust the hydroxyl value of the resin within the above-defined range.

A basic compound can be added to the resulting acrylic resin emulsion to neutralize whole or a part of the acidic groups, preferably carboxylic acid groups in order to secure the stability of the acrylic resin emulsion. The basic compound includes, for example, ammonia, an amine, an alkaline metal, and the like, which can be appropriately used in the present invention.

Hydroxyl Group-Containing Polyester Resin

The hydroxyl group-containing polyester resin includes oil-free polyester resin obtained/obtainable by a condensation of an polyhydric alcohol component with a polybasic acid component; an oil-modified polyester resin obtained/obtainable by a reaction of three components: an polyhydric alcohol component, a polybasic acid component, and an oil component including at least one fatty acid selected from the group consisting of castor oil, hydrogenated castor oil, tung oil, sunflower oil, soybean oil, linseed oil, tall oil, coconut oil and a mixture thereof, etc. The hydroxyl group-containing polyester resin includes a polyester resin obtained/obtainable by grafting of an acrylic resin or a vinyl resin. The hydroxyl group-containing polyester resin includes urethane-modified polyester resin obtained/obtainable by a reaction of a polyisocyanate compound with a polyester resin obtained/obtainable by a reaction of the polyhydric alcohol component with the polybasic acid component.

The hydroxyl group-containing polyester resin has a number average molecular weight (Mn) within a range of from 800 to 10000, and preferably within a range of from 1000 to 8000. When Mn is less than 800, the polyester resin may have an inferior stability wherein the polyester resin is dispersed in water. When Mn is more than 10000, the polyester resin may have an increased viscosity, and therefore, the resulting coating composition may have a decreased solid content or an inferior application workability.

The hydroxyl group-containing polyester resin has a hydroxyl value within a range of from 35 to 170 mgKOH/g, and preferably within a range of from 50 to 150 mgKOH/g. When the hydroxyl value is less than 35 mgKOH/g, the resulting coating film may have an inferior curability. When the hydroxyl vale is more than 170 mgKOH/g, the resulting coating film may have an inferior chipping resistance.

The hydroxyl group-containing polyester resin has an acid value preferably within a range of from 15 to 100 mgKOH/g, and more preferably within a rage of from 20 to 80 mgKOH/g. When the acid value is less than 15 mgKOH/g, the polyester resin may have an inferior dispersing stability to water. When the acid value is more than 100 mgKOH/g, the resulting coating film may have an inferior water resistance.

The hydroxyl group-containing polyester resin has a glass transfer temperature within a preferable range of from −40 to 50° C. When the glass transfer temperature is less than −40° C., the resulting coating film may have a decreased hardness. When the glass transfer temperature is more than 50° C., the resulting coating film may have an inferior hiding ability relative to the underlying layer. It is more preferable that the glass transfer temperature is within a range of from −40 to 10° C. Herein, the glass transfer temperature can be determined by a differential scanning calorimeter (DSC), etc.

The polyhydric alcohol component includes, for example, a diol such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonaediol, 1,4-cyclohexanediol, neopentyl glycol hydroxypivalate, 2-butyl-2-ethyl-1,3-propanediol, 3-methyl-1,5-pentanediol, 2,2,4-trimethylpentanediol, hydrogenated bisphenol A, and the like; a trihydric or polyhydric polyol component such as trimethylolpropane, trimethylolethane, glycerin, pentaerythritol, and the like; a hydroxyl group-containing carboxylic acid component such as 2,2-dimethylol propionic acid, 2,2-dimethylol butanoic acid, 2,2-dimethylol pentanoic acid, 2,2-dimethylol hexanoic acid, 2,2-dimethylol octanoic acid, etc.

The polybasic acid component includes, for example, an aromatic polycarboxylic acid and an anhydride thereof such as phthalic anhydride, isophthalic acid, terephthalic acid, trimellitic anhydride, tetrabromophthalic anhydride, tetrachlorophthalic anhydride, pyromellitic anhydride, and the like; an alicyclic polycarboxylic acid and an anhydride thereof such as hexahydrophthalic anhydride, tetrahydrophthalic anhydride, 1,4- or 1,3-cyclohexane dicarboxylic acid, and the like; an aliphatic polycarboxylic acid and an anhydride thereof such as maleic anhydride, fumaric acid, succinic anhydride, adipic acid, sebacic acid, azelaic acid, and the like; and an anhydride thereof, etc. If necessary, the acid component may be used in a combination with a monobasic acid such as benzoic acid and t-butyl benzoate.

The component to prepare the polyester resin includes, as an additional component, a monohydric alcohol; a monoepoxide compound such as Cardura E (under a product name) produced by Shell; a lactone such as β-propiolactone, dimethylpropiolactone, butyrolactone, γ-valerolactone, ε-caprolactone, γ-caprolactone, γ-caprylolactone, crotolactone, δ-valerolactone, δ-caprolactone, etc. Particularly, addition of the lactone, with its ring opening, to the polyester chain obtained/obtainable by a reaction of the polycarboxylic acid with the polyhydric alcohol can form a polyester chain by itself. Furthermore, the lactone is effective to improve the chipping resistance of the waterborne intermediate coating composition. The additional component can be contained in an amount within a range of from 3 to 30% by weight, preferably within a range of from 5 to 20% by weight, and particularly preferably within a range of from 7 to 15% by weight relative to total weight of all components.

The hydroxyl group-containing polyester resin can be easily formed to be in an aqueous form by controlling the acid value, and by neutralizing the acid group, particularly the carboxylic acid group, with a basic substance. Herein, the basic substance includes, for example, ammonia, methylamine, ethylamine, dimethylamine, diethylamine, trimethylamine, triethylamine, dimethylethanolamine, diethanolamine, triethanolamine, etc. Among others, preferable are diethanolamine, dimethylethanolamine, triethanolamine, etc. Herein, the neutralization ratio is, but is not particularly limited to, for example, 50% or more, and more preferably within a range of from 80 to 120%.

Melamine Resin

The melamine resin can be contained in the waterborne intermediate coating composition, and react with the acrylic resin contained in the emulsion and the hydroxyl group-containing polyester resin in order to cure them. The melamine resin includes, but is not particularly limited to, for example, preferably, an imino type melamine resin, such as an imino type melamine resin produced by Mitsui Cytec Industries Inc., under a product name of Cymel 211; an imino type melamine resin produced by Mitsui Cytec Industries Inc., under a product name of Cymel 327, etc.

The melamine resin preferably includes an alkyl-etherized melamine resin, and more preferably a methoxy and/or butoxy group-containing melamine resin, such as Cymel 325, Cymel 327, Cymel 370 and Mycoat 723, each of which has a methoxy group; Cymel 202, Cymel 204, Cymel 232, Cymel 235, Cymel 236, Cymel 238, Cymel 254, Cymel 266 and Cymel 267 (under a product name), each of which is produced by Mitsui Cytec Industries Inc., and each of which has a methoxy group and a butoxy group; Mycoat 506 (under a product name) (produced by Mitsui Cytec Industries Inc.), and U-Van 20N60 and U-Van 20SE (under a product name), each of which is produced by Mitsui Chemicals, Inc., and each of which has a butoxy group, etc. A single melamine resin may be used alone. Alternatively, two or more melamine resins may be used in a combination.

Carbodiimide

The carbodiimide includes any carbodiimide compound prepared by any conventional method, such as a carbodiimide generally prepared by a condensation wherein an organic diisocyanate is subjected to a decarboxylation at the isocyanate terminals to produce a polycarbodiimide compound. In a preferable embodiment, the preparation of the polycarbodiimide compound includes steps of reacting a polycarbodiimide compound having at least two isocyanate groups in one molecule with a polyol wherein a hydroxyl group presets at the terminal to give a reaction product, wherein molar ratio of the total isocyanate groups of the polycarbodiimide compound to the total hydroxyl groups of the polyol is more than 1, and reacting the reaction product with a hydrophilicizing agent having an active hydrogen and a hydrophilic moiety to produce a hydrophilicized carbodiimide compound. Such hydrophilicized carbodiimide compound is preferably used in the present invention.

The polycarbodiimide compound having at least two isocyanate groups in one molecule includes, but is not particularly limited to, preferably, a carbodiimide compound having an isocyanate group at one terminal and another isocyanate group on the other terminal, which has an excellent reactivity. The carbodiimide compound having at least two isocyanate groups on the both terminals can be prepared by a method known to those skilled in the art, for example, which includes a condensation wherein an organic diisocyanate is subjected to a decarboxylation.

Associative Thickener

The associative thickener which can be used in the waterborne intermediate coating composition according to the present invention comprises an urethane compound (A) represented by the formula (1), and an urethane compound (B) represented by the formula (2):

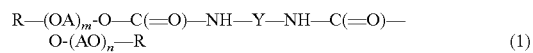

$$R-(OA)_m-O-C(=O)-NH-Y-NH-C(=O)-O-(AO)_n-R \quad (1)$$

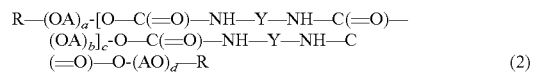

$$R-(OA)_a-[O-C(=O)-NH-Y-NH-C(=O)-(OA)_b]_c-O-C(=O)-NH-Y-NH-C(=O)-O-(AO)_d-R \quad (2)$$

wherein

R independently represents a hydrocarbon group having 8 to 24 carbon atoms,

Y independently represents a residue resulted from a removal of two isocyanate groups from a diisocyanate, OA independently represents an oxyalkylene group having 2 to 4 carbon atoms, AO independently represents an alkyleneoxy group having 2 to 4 carbon atoms, O represents an oxygen atom, C represents a carbon atom, N represents a nitrogen atom, m independently represents an integer of 20 to 500, n independently represents an integer of 20 to 500, a independently represents an integer of 1 to 100, d independently represents an integer of 1 to 100, b represents an integer of 40 to 500, c represents an integer of 1 to 5, b by c (or b×c) represents an integer of 150 to 2500, and R may be the same or different, and Y may be the same or different, wherein each of the urethane compounds (A) and (B) has at least 80% by weight of oxyethylene groups and ethyleneoxy groups relative to the total weight of the oxyalkylene groups and the alkyleneoxy groups.

The example of the hydrocarbon group having 8 to 24 carbon atoms, which is represented by R, includes a linear alkyl, such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, and the like; a branched alkyl, such as 2-ethylhexyl, isodecyl, isotridecyl, isostearyl, and the like; a linear alkenyl, such as n-octenyl, n-decenyl, n-undecenyl, n-dodecenyl, n-tridecenyl, n-tetradecenyl, n-pentadecenyl, n-hexadecenyl, n-heptadecenyl, n-octadecenyl, and the like; and a branched alkenyl, such as isooctenyl, isodecenyl, isoundecenyl, isododecenyl, isotridecenyl, isotetradecenyl, isopentadecenyl, isohexadecenyl, isoheptadecenyl, isooctadecenyl, and the like; etc. Among others, the linear alkyl and the linear alkenyl are preferable from the aspects of the finishing property, and the like. The linear alkyl is more preferable. n-Hexadecyl, n-heptadecyl, n-octadecyl, n-nonadecyl, n-eicosyl, n-heneicosyl and n-docosyl are particularly preferable. Herein, R in the formulae may be identical or different.

The residue, which is represented by Y, can be resulted from a removal of two isocyanate groups from a diisocyanate. The diisocyanate includes aliphatic diisocyanate, aromatic diisocyanate, alicyclic diisocyanate, and the like. Herein, Y in the formulae may be identical or different.

The example of the aliphatic diisocyanate includes an aliphatic diisocyanate having 3 to 15 carbon atoms, such as methylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, bis(isocyanatopropyl)ether, 1,1-dimethylbutane-1,4-diisocyanate, 3-methoxyhexane-1,6-diisocyanate, 2,2,4-trimethylpentane-1,5-diisocyanate, 3-butoxy-1,6-hexane diisocyanate, 1,4-butylene glycol bis(isocyanatopropyl)ether, etc.

The aromatic diisocyanate includes an aromatic diisocyanate having 8 to 20 carbon atoms, such as meta-phenylene diisocyanate, para-phenylene diisocyanate, 2,4-tolylene diisocyanate, 2,6-tolylene diisocyanate, dimethylbenzene diisocyanate, ethylbenzene diisocyanate, isopropylbenzene diisocyanate, biphenyl diisocyanate, 4,4'-diisocyanato-2,2'-dimethylbiphenyl, 4,4'-diisocyanato-3,3'-dimethoxybiphenyl, 1,5-diisocyanatonaphthalene, 4,4'-diisocyanatodiphenylmethane-4,4'-diisocyanato-2,2'-dimethyldiphenylmethane, 4,4'-diisocyanato-3,3'-dimethoxydiphenylmethane, 3,3'-diisocyanato-4,4'-dimethoxydiphenylmethane, 3,3'-diisocyanato-4,4'-diethoxydiphenylmethane, 4,4'-diisocyanato-2,2'-dimethyl-5,5'-dimethoxydiphenylmethane, meta-xylylenediisocyanate, para-xylylenediisocyanate, tetramethylxylylenediisocyanate, etc.

The alicyclic diisocyanate includes an alicyclic diisocyanate having 8 to 20 carbon atoms, such as 1,3-diisocyanatocyclohexane, 1,3-bis(isocyanatomethyl)cyclohexane, 1-isocyanato-3-isocyanatomethyl-3,5,5-trimethylcyclohexane, 4,4'-diisocyanatodicyclohexylmethane, etc.

Among these diisocyanates, the aliphatic diisocyanate and the alicyclic diisocyanate are preferable. The aliphatic diisocyanate is more preferable. Hexamethylene diisocyanate and octamethylene diisocyanate are particularly preferable.

The oxyalkylene group having 2 to 4 carbon atoms, which is represented by OA, includes oxyethylene, oxypropylene, oxybutylene, etc. The oxyalkylene group may be in a combination thereof. In case of the combination, the combined embodiment includes a block form, a random form, and a combination of a block form and a random form. The block form and a combination of a block form and a random form are preferable. The block form is more preferable.

The alkyleneoxy group having 2 to 4 carbon atoms, which is represented by AO, includes ethyleneoxy, propyleneoxy, butyleneoxy, etc. The alkyleneoxy group may be in a combination thereof. In case of the combination, the combined embodiment includes a block form, a random form, and a combination of a block form and a random form. The block form and a combination of a block form and a random form are preferable. The block form is more preferable.

Each of the urethane compound (A) represented by the formula (1) and the urethane compound (B) represented by the formula (2) necessary comprises an oxyethylene group(s) and an ethyleneoxy group(s). Each compound has the oxyethylene group(s) and the ethyleneoxy group(s) preferably in an amount of at least 80% by weight, more preferably 85% by weight or more, and particularly preferably 90% by weight or more, relative to the total weight of the oxyalkylene group(s) and the alkyleneoxy group(s). When the content (in % by weight) is within the above-defined range, the finishing property is further improved.

m is independently an integer of 20 to 500, preferably an integer of 30 to 300, and more preferably an integer of 40 to 200. When m is independently within the above-defined range, the finishing property is further improved.

n is independently an integer of 20 to 500, preferably an integer of 30 to 300, and more preferably an integer of 40 to 200. When n is independently within the above-defined range, the finishing property is further improved.

a is independently an integer of 1 to 100, preferably an integer of 2 to 70, and more preferably an integer of 3 to 40. When a is independently within the above-defined range, the finishing property is further improved.

d is independently an integer of 1 to 100, preferably an integer of 2 to 70, and more preferably an integer of 3 to 40. When d is independently within the above-defined range, the finishing property is further improved.

b is an integer of 40 to 500, preferably an integer of 55 to 400, and more preferably an integer of 70 to 300. When b is within the above-defined range, the finishing property is further improved.

c is an integer of 1 to 5, preferably an integer of 1 to 4, and more preferably an integer of 1 to 3. When c is within the above-defined range, the finishing property is further improved.

b by c, which is represented by (b×c), is an integer of 150 to 2500, preferably an integer of 200 to 2000, and more preferably an integer of 250 to 1500. When b by c (or b×c) is within the above-defined range, the finishing property is further improved.

The urethane compound (A) represented by the formula (1) may be a mixture, since the components in the urethane compound (A) such as $(OA)_m$ and $(AO)_n$ usually have a distribution. In case of the mixture, the weight average molecular weight (Mw) of the urethane compound represented by the formula (1) is preferably within a range of from 5000 to 20000, and more preferably within a range of from 7000 to 15000. When the weight average molecular weight is within the above-defined range, the finishing property is further improved. When the molecular weight of the above-mentioned compound (A) is less than 5000, the finished texture of the resulting coating film may be deteriorated. When the molecular weight is more than 20000, the solid content of the resulting coating composition may be less than 24% by weight, wherein the coating composition has been diluted so that the viscosity determined by No. 4 Ford Cup (at 20° C.) is 45 (seconds), and therefore this is not acceptable.

The urethane compound (B) represented by the formula (2) may be a mixture, since the components in the urethane compound (B) such as $(OA)_a$, $(OA)_b$, $(AO)_d$ and $[O-C(=O)-NH-Y-NH-C(=O)-(OA)_b]_c$ usually have a distribution. In case of the mixture, the weight average molecular weight (Mw) of the urethane compound (B) represented by the formula (2) is preferably within a range of from 20000 to 100000, and more preferably within a range of from 20000 to 60000. The weight average molecular weight is within the above-defined range, the finishing property is further improved. When the molecular weight of the above-mentioned compound (B) is less than 20000, the flip-flop (FF) property of the resulting coating film may be less than 3.80, and the appearance of the coating film may be deteriorated. On the other hand, when the molecular weight is more than 100000, the solid content of the resulting coating composition may be less than 24% by weight, wherein the coating composition has been diluted so that the viscosity determined by No. 4 Ford Cup (at 20° C.) is 45 (seconds), and therefore this is not acceptable.

Herein, the weight average molecular weight (Mw) can be determined by a gel permeation chromatography (GPC) with a polystyrene standard having a known molecular weight. For example, the weight average molecular weight (Mw) can be determined by a GPC apparatus (model: HLC-8120GPC), manufactured by TOSOH CORPORATION, equipped with two columns: Super H-4000 manufactured by TOSOH CORPORATION and one column: Super H-3000 which are connected directly each other; a differential refractive index detector; and a data processing machine (model: SC-8020) manufactured by TOSOH CORPORATION, under such conditions that column temperature is 40° C., eluent is THF (in the first grade, produced by KATAYAMA CHEMICAL., LTD.), flow rate is 0.5 mL/min, sample concentration is 1% by weight, 10 μL of sample solution is injected.

The urethane compound (A) represented by the formula (1) and the urethane compound (B) represented by the formula (2) can be produced by using a known urethanation reaction (e.g., in the Japanese Patent Application Publication No. 2000-303006). For example, the urethane compound (A) can be synthesized by a reaction of a polyether monool with a diisocyanate for 2 to 10 hours. On the other hand, the urethane compound (B) can be synthesized by a reaction of a polyether monool and a polyether diol with a diisocyanate for 2 to 10 hours. Although any by-products may be formed during the reaction, the reaction mixture containing such by-products can be used as it is.

Content of the urethane compound (A) is required to be within a range of from 5 to 95% by weight, preferably within a range of from 10 to 80% by weight, more preferably within a range of from 20 to 70% by weight, and particularly preferably within a range of from 25 to 65% by weight, relative to the total weight of the urethane compound (A) and the urethane compound (B). When the content is within the above-defined range, the finishing property is further improved.

Content of the urethane compound (B) is required to be within a range of from 5 to 95% by weight, preferably within a range of from 10 to 80% by weight, more preferably within a range of from 15 to 60% by weight, and particularly preferably within a range of from 17 to 40% by weight, relative to the total weight of the urethane compound (A) and the urethane compound (B). When the content is within the above-defined range, the finishing property is further improved.

When the amount of the urethane compound (A) to be added is larger, the finished texture may be poorer. On the other hand, when the amount of the urethane compound (B) to be added is larger, the solid content of the resulting coating composition may be less than 24% by weight, wherein the coating composition has been diluted so that the viscosity determined by No. 4 Ford Cup (at 20° C.) is 45 (seconds), and therefore this is not acceptable.

A homogeneously mixing of the urethane compound (A) and the urethane compound (B) can provide the thickener to be employed in the waterborne intermediate coating composition according to the present invention. The method for the homogeneously mixing includes a conventional method wherein the mixing is preferably carried out at about 70 to 150° C. from the aspect of the mixing efficiency, and the like.

The associative thickener in the present invention, if necessary, may comprise an organic solvent and/or water. The organic solvent includes, but is not particularly limited to, for example, isobutyl alcohol, butyl cellosolve, butyl carbitol, isopropanol, and the like. The total content of the organic solvent and water is within a range of from 10 to 99% by weight based on the total weight of the thickener composition.

The content of the thickener in the present invention is preferably within a range of from 0.05 to 2.0% by weight, and more preferably within a range of from 0.5 to 1.8% by weight, relative to the solid resin content of the waterborne intermediate coating composition. The viscosity of the waterborne intermediate coating composition is further improved when the content is within the above-defined range.

The above-described associative thickener includes, but is not particularly limited to, for example, a commercially available product, under a product name, such as Adekanol UH-420, Adekanol UH-462, Adekanol UH-472, Adekanol UH-540 and Adekanol UH-814N (produced by ADEKA CORPORATION), Primal RH-1020 (produced by Rohm and Hass Company), Kuraraypoval (produced by KURARAY CO., LTD.), etc. The associative thickener can be used alone. Alternatively, one or more associative thickeners can be used in a combination.

The addition of the associative thickener can improve viscosity of the waterborne intermediate coating composition. Therefore, upon applying the waterborne intermediate coating composition, sagging of the applied coating composition can be suppressed. In addition, it can further reduce miscibility between the intermediate coating film and the base coating film. As a result, in comparison with the case wherein such associative thickener is absent, the application workability during the coating procedure can be improved by the associative thickener, and it can provide the resulting coating film with an excellent finished appearance.

With respect to the content of the associative thickener relative to 100 parts by weight of the solid resin content of the above-described waterborne intermediate coating composition (i.e., solid content of the all resins contained in the waterborne intermediate coating composition), preferable lower limit is 0.01 part by weight, more preferable lower limit is 0.1 part by weight, and preferable upper limit is 20 parts by weight, more preferable upper limit is 10 parts by weight. When the content is less than 0.01 part by weight, thickening effects may not be provided, and therefore, sagging may occur during the coating procedure. When the content is more than 20 parts by weight, appearance and properties of the resulting coating film may be deteriorated.

Herein, in the waterborne intermediate coating composition to be used in the present invention, weight ratio of the hydroxyl group-containing acrylic resin emulsion to the associative thickener (i.e., hydroxyl group-containing acrylic resin emulsion/associative thickener) is within a range of from 100/0.1 to 100/50, and preferably within a range of 100/1 to 100/10 as a basis of the solid content. When the weight ratio is within the above-defined range, it provides the waterborne intermediate coating composition with excellent effects such as an excellent storage stability and an improved application workability, and it provides the resulting coating film with excellent effects such as an excellent finished appearance.

Other Resins

The waterborne intermediate coating composition which can be used in the present invention may comprise further additional component(s) such as an additional resin, a pigment-dispersed paste, an additional additive, etc. The additional resin includes, but is not particularly limited to, for example, a polyester resin, a water-soluble acrylic resin, a polyether resin, an epoxy resin, etc.

Pigment Dispersed Paste

The pigment dispersed paste is previously obtained/obtainable by dispersing a pigment and a pigment dispersing agent into a small amount of an aqueous medium. The pigment dispersing agent can contain no volatile basic substance(s), or contain no more than 3% by weight of a volatile basic substance relative to the weight of the solid content of the pigment dispersing agent. Such pigment dispersing agent contained in the waterborne intermediate coating composition which can be used in the present invention can reduce an amount of the volatile basic substance in the resulting coating film formed with the waterborne intermediate coating composition, and suppress yellowing of the resulting multilayer coating film. Therefore, when the content of the volatile basic substance is more than 3% by weight relative to the weight of the solid content of the pigment dispersing agent, the resulting multilayer coating film may be yellowed, and therefor have an inferior exterior appearance. In this case, it is not desirable.

The volatile basic substance includes a basic substance having a boiling point of 300° C. or less, which includes, for example, a nitrogen containing inorganic or organic basic substance. The inorganic basic substance includes ammonia, etc. The organic basic substance includes, for example, an amine including a primary, secondary or tertiary amine having a linear or branched alkyl group having 1 to 20 carbon atoms, such as methylamine, dimethylamine, trimethylamine, ethylamine, diethylamine, triethylamine, isopropylamine, diisopropylamine, dimethyldodecylamine, and the like;

a primary, secondary or tertiary amine having a linear or branched hydroxyalkyl group having 1 to 20 carbon atoms, such as monoethanolamine, diethanolamine, 2-amino-2-methylpropanol, and the like;

a primary, secondary or tertiary amine having a linear or branched alkyl group having 1 to 20 carbon atoms and a linear or branched hydroxyalkyl group having 1 to 20 carbon atoms, such as dimethylethanolamine, diethylethanolamine, and the like;

a substituted or unsubstituted linear polyamine having 1 to 20 carbon atoms, such as diethylenetriamine, triethylenetetramine, and the like;

a substituted or unsubstituted cyclic monoamine having 1 to 20 carbon atoms, such as morpholine, N-methylmorpholine, N-ethylmorpholine, and the like;

a substituted or unsubstituted cyclic polyamine having 1 to 20 carbon atoms, such as piperazine, N-methylpiperazine, N-ethylpiperazine, N,N-dimethylpiperazine, and the like, etc.

The other component than the above-described pigment dispersing agent in the waterborne intermediate coating composition which can be used in the present invention may contain a volatile basic substance. Therefore, it is more preferable that the pigment dispersing agent contains a volatile basic substance in a much smaller amount. Therefore, it is much more preferable that the pigment dispersing agent contains substantially no volatile basic substance, and that the dispersing is carried out by using such pigment dispersing agent. Herein, it is further preferable that a conventional pigment-dispersing resin neutralized with an amine is not employed. It is much further preferable that the pigment dispersing agent is used so that the content of the volatile basic substance in the applied coating composition is no more than $7 \times 10^{-6}$ mmol/mm² during the formation of the multilayer coating film according to the present invention.

The pigment dispersing agent is a resin having a pigment-compatible moiety and a hydrophilic moiety. The pigment-compatible moiety and the hydrophilic moiety include, for example, nonionic, cationic and anionic functional groups. The pigment dispersing agent may have two or more of such functional groups in one molecule.

The nonionic functional group includes, for example, a hydroxyl group, an amide group, a polyoxyalkylene group, etc. The cationic functional group includes, for example, an amino group, an imino group, a hydrazino group, etc. The anionic functional group includes, for example, a carboxyl group, a sulfonic acid group, a phosphoric acid group, etc. Such pigment dispersing agent can be prepared by a conventional method known to those skilled in the art.

The pigment dispersing agent includes, but is not particularly limited to, a pigment dispersing agent containing no volatile basic substance, a pigment dispersing agent containing no more than 3% by weight of a volatile basic substance relative to the weight of the solid content of the pigment dispersing agent. It is preferable that a small amount of the pigment dispersing agent can effectively disperse any pigment therein. The pigment dispersing agent includes, for example, a commercially available dispersing agent, such as Disperbyk 190, Disperbyk 181 and Disperbyk 182 (under a product name), each of which is a copolymer having a high molecular weight, and Disperbyk 184 (under a product name) which is a copolymer having a high molecular weight, each of which is an anionic or nonionic dispersant produced by Byk-Chemie; EFKAPOLYMER 4550 (under a product name), which is an anionic or nonionic dispersant produced by EFKA; Solsperse 27000 (under a product name), which is a nonionic dispersant produced by Avecia KK; and Solsperse 41000 and Solsperse 53095 (under a product name), each of which is an anionic dispersant produced by Avecia KK, etc.

The pigment dispersing agent has a number average molecular weight preferably within a range of from 1000 (as a lower limit) to 100000 (as an upper limit). When the number average molecular weight is less than 1000, dispersing stability may be insufficient. When the number average molecular weight is more than 100000, viscosity may be too high to be handled. The lower limit of the number average molecular is more preferably 2000, and an upper limit of the number average molecular is more preferably 50000. The lower limit is further more preferably 4000, and the upper limit is further more preferably 50000.

The pigment dispersed paste can be obtained/obtainable by a conventional method known to those skilled in the art wherein the above-described pigment dispersing agent and a pigment are mixed. It is preferable that content of the pigment dispersing agent is within a range of from 1% by weight (as a lower limit) to 20% by weight (as an upper limit) relative to the weight of the solid content of the prepared pigment dispersed paste. When the content is less than 1% by weight, it may be difficult to stably disperse a pigment therein. When the content is more than 20% by weight, the resulting coating film may have inferior properties. The lower limit is preferably 5% by weight, and the upper limit is preferably 15% by weight.

The pigment includes, but is not particularly limited to, any pigment which can be used in a conventional waterborne coating composition. The pigment is preferably a coloring pigment in order to provide the resulting coating film having an improved weather resistance and a sufficient hiding ability relative to the underlying layer. Titanium dioxide is particularly preferable, since titanium dioxide has an excellent coloring property and an excellent hiding ability relative to the underlying layer, and titanium dioxide is economical.

The pigment includes titanium dioxide, and, for example, an organic coloring pigment, such as an azo-chelate pigment, an insoluble azo pigment, a condensed azo pigment, a phthalocyanine pigment, an indigo pigment, a perinone pigment, a perylene pigment, a dioxane pigment, a quinacridone pigment, an isoindolinone pigment, a diketopyrrolopyrrole pigment, a benzimidazolone pigment, a metal complex pigment, and the like; an inorganic coloring pigment, such as chrome yellow, yellow iron oxide, red iron oxide, carbon black, and the like; etc. Filler pigment may be used in a combination with the above-described pigment, such as calcium carbonate, barium sulfate, clay, talc, etc.

A conventional gray coating composition which essentially contains carbon black and titanium dioxide pigments may be used in the present invention. Herein, a coating composition wherein color properties such as brightness and color are matched with those of a top coating composition to be further applied thereon may be used in the present invention. In the coating composition, two or more coloring pigments may be used in a combination.

Pigment weight content (PWC) (as a basis of weight) is preferably within a range of from 10 to 60% by weight relative to total weight of all the solid resin contents and the pigment in the waterborne intermediate coating composition. When the content is less than 10% by weight, the hiding ability relative to the underlying layer may be lowered. When the content is more than 60% by weight, viscosity may be increased, during the curing procedure, and then flowability may be reduced to provide the resulting coating film with an inferior exterior appearance.

Content of the pigment dispersing agent is preferably within a range of from 0.5% by weight (as a lower limit) to 10% by weight (as an upper limit) relative to weight of the pigment. When the content is less than 0.5% by weight, the dispersing stability of the pigment may be lowered due to the small content of the pigment dispersing agent. When the content is more than 10% by weight, the resulting coating film may have inferior properties. The lower limit is preferably 1% by weight, and the upper limit is preferably 5% by weight.

The other additional additive than the above-described components includes a conventional additive to be added to a conventional coating composition, such as a thickening agent, a filler, an ultraviolet absorbing agent, an anti-oxidizing agent, an anti-foaming agent, a surface conditioning agent, an anti-pinhole agent, etc. Content of the other additional additive can be appropriately determined by those skilled in the art.

The waterborne intermediate coating composition which can be used in the present invention desirably comprises, relative to the total weight of the solid resin contents in the composition,
the hydroxyl group-containing polyester resin in an amount within a range of from 5 to 70% by weight, preferably within a range of from 20 to 65% by weight, and more preferably within a range of from 40 to 60% by weight;
the hydroxyl group-containing acrylic resin emulsion in an amount within a range of from 1 to 30% by weight, preferably within a range of from 2 to 25% by weight, and more preferably within a range of from 4 to 20% by weight;
the melamine resin in an amount within a range of from 10 to 40% by weight, preferably within a range of from 20 to 37% by weight, and more preferably within a range of from 25 to 35% by weight;
the carbodiimide in an amount within a range of from 3 to 25% by weight, preferably within a range of from 5 to 15% by weight, more preferably within a range of from 7 to 12% by weight; and
the associative thickener in an amount within a range of from 0.05 to 2% by weight, preferably within a range of from 0.1 to 1.5% by weight, more preferably within a range of from 0.2 to 1.2% by weight.

The above-defined each range can significantly suppress sagging of the resulting waterborne intermediate coating composition during the coating procedure.

The waterborne intermediate coating composition which can be used in the present invention can be prepared by mixing the above-described components such as the hydroxyl group-containing acrylic resin emulsion, the hydroxyl group-containing polyester resin, the melamine resin, the carbodiimide, and the associative thickener.

Weight ratio of the acrylic resin emulsion to the hydroxyl group-containing polyester resin (i.e., acrylic resin emulsion/ hydroxyl group-containing polyester resin) is within a range of from 1/1 to 1/20 as a basis of the solid content. When the weight ratio is more than 1/1, the resulting coating composition may have an increased viscosity, and therefore, the resulting intermediate coating film may have an inferior smoothness, or an inferior exterior appearance. When the weight ratio is less than 1/20, water-absorbing rate and elution rate of the resulting intermediate coating film may be increased, and therefore, the resulting intermediate coating film may have an inferior exterior appearance.

The additional optional resin component, the pigment dispersed paste or the other additional additive may be added to the composition in an appropriate amount. Content of the additional optional resin component is preferably no more than 50% by weight relative to total weight of all the solid resin contents in the waterborne intermediate coating composition. When the content is more than 50% by weight, it may be difficult that the resulting coating composition has an increased solid concentration. In this case, it is not preferable.

These additional components may be added before or after addition of the curing agent into the emulsion. The waterborne intermediate coating composition includes, but is not particularly limited to, for example, an aqueous form such as an aqueous solution, an aqueous dispersion, an aqueous emulsion, etc.

Waterborne Base Coating Composition

The waterborne base coating composition which can be used in the present inventive method includes a coating composition which can be conventionally used in the art as a waterborne base coating composition for coating a vehicle body such as an automobile. For example, the waterborne base coating composition comprises a film forming resin, and if necessary, a curing agent, a pigment such as a luster color pigment, a coloring pigment, a filler pigment or the like, and an additive, which are dispersed or dissolved in an aqueous medium. The film forming resin includes, for example, a polyester resin, an acrylic resin, an urethane resin, a carbonate resin, an epoxy resin, etc. The preferable film forming resin is an acrylic resin and/or a polyester resin, which may be in a combination with a melamine resin, which combination has a pigment dispersibility and an application workability. The curing agent, the pigment and the additive include those conventionally used in the art.

The pigment weight content (PWC) in the waterborne base coating composition is generally within a range of from 0.1% by weight (as a lower limit) to 50% by weight (as an upper limit). The lower limit is preferably 0.5% by weight, and the upper limit is preferably 40% by weight. The lower limit is more preferably 1% by weight, and the upper limit is more preferably 30% by weight. When the pigment weight content is less than 0.1% by weight, the pigment may provide no effect. When the pigment weight content is more than 50% by weight, the resulting coating film may have a deteriorated exterior appearance.

The waterborne base coating composition can be prepared by a similar method to that described in the preparation of the intermediate coating composition. The waterborne base coating composition includes, but is not particularly limited to, for example, an aqueous form, such as an aqueous solution, an aqueous dispersion, an aqueous emulsion, etc.

Clear Coating Composition

The clear coating composition which can be used in the present inventive method includes a coating composition which can be conventionally used in the art as a clear coating composition for coating a vehicle body such as an automobile. For example, the clear coating composition comprises a film forming resin, and if necessary, a curing agent and an additive, which are dispersed or dissolved in a medium. The film forming resin includes, for example, an acrylic resin, a polyester resin, an epoxy resin, an urethane resin, etc. The film forming resin may be used in a combination with a curing agent such as an amino resin and/or an isocyanate resin. The preferable film forming resin is an acrylic resin and/or a polyester resin, which may be in a combination with an amino resin, which combination can provide the resulting coating film with improved properties such as improved transparency, acid etching resistance, etc. An acrylic resin and/or a polyester resin in a carboxylic acid-epoxy curing system is also preferable, since such system can provide the resulting coating film with improved properties such as improved transparency, acid etching resistance, etc.

The clear coating composition includes any type of coating compositions, such as an organic solvent type, an aqueous type such as an aqueous solution, an aqueous dispersion and an aqueous emulsion, a non-aqueous dispersion type, a powder type, etc. The clear coating composition may further comprise, if necessary, a curing catalyst, a surface conditioning agent, etc.

Method for Producing Multilayer Coating Film

The method for producing the multilayer coating film according to the present invention includes an initial step of applying an electrodeposited coating film to an article to be coated. The electrodeposited coating film can be formed by applying an electrodeposition coating composition on the article to be coated, and baking and curing the applied electrodeposition coating composition on the article. The article to be coated includes, but is not particularly limited to, a metal product which can be subjected to a cationic or anionic electrodeposition coating procedure. The article includes, for example, a product made of a metal such as iron, copper, aluminum, tin, zinc, or the like; and a product made of an alloy containing the above-listed metal; etc. The electrodeposition coating composition includes, but is not particularly limited to, a conventional cationic electrodeposition coating composition and a conventional anionic electrodeposition coating composition, each of which is known to those skilled in the art. Application, baking and curing of the electrodeposition coating composition can be carried out according to the conventional method and conditions known to those skilled in the art with respect to the conventional electrodeposition coating procedure for a vehicle body such as an automobile.

Subsequently, the waterborne intermediate coating composition can be applied on an electrodeposited coating film to form an intermediate coating film. The intermediate coating composition can be applied, for example, sprayed, by using so-called a "react gum" which is an air electrostatic spraying machine, so-called a "micro-micro bell (μμ bell)", a "micro bell (μ bell)" or a "metallic bell (meta-bell)", each of which is a rotary atomization electrostatic coating machine, etc.

An application amount of the coating composition can be determined such that the resulting cured coating film has a thickness within a range of from 10 to 40 μm, and preferably within a range of from 15 to 30 μm. When the thickness is less than 10 μm, the resulting coating film may have a deteriorated appearance and a deteriorated chipping resistance. When the thickness is more than 40 μm, there may be disadvantages such as sagging during the coating procedure and pinhole during baking and curing.

It is preferable that the applied intermediate coating composition can be previously dried, i.e., pre-heated by heating or air drying, and then the waterborne base coating composition can be applied thereon. Herein, insufficient drying of the applied intermediate coating composition may allow the water contained in the coating composition to be suddenly boiled up during the baking of the multilayered coating film, which may easily cause popping. In addition, the insufficiently dried intermediate coating composition may be easily miscible with the base coating composition to be further applied thereon to provide the resulting coating film with a deteriorated exterior appearance.

Subsequently, the waterborne base coating composition can be applied on the uncured intermediate coating film to from a base coating film, and then, by a wet-on-wet coating procedure, the clear coating composition can be applied on the uncured base coating film to form a clear coating film. Herein, the wet-on-wet coating procedure includes an application of a coating composition on an uncured coating film which may be previously dried, i.e., pre-heated, but is not completely cured.

Generally, an application amount of the waterborne base coating composition can be determined such that the resulting cured coating film has a thickness within a range of from 10 to 30 μl. When the thickness is less than 10 μm, the resulting coating film may have an inferior hiding ability relative to the underlying layer and an ununiform color. When the thickness is more than 30 μm, there may be disadvantages such as sagging during the coating procedure and pinhole during baking and curing.

Generally, an application amount of the clear coating composition can be determined such that the resulting cured coating film has a thickness within a range of from 10 to 70 μm. When the thickness is less than 10 μm, the resulting multilayer coating film may have a decreased gloss or an inferior exterior appearance. When the thickness is more than 70 μm, the resulting multilayer coating film may have an inferior sharpness, or there may be disadvantages such as ununiformity and flowing off during the coating procedure.

Subsequently, the intermediate coating film, the base coating film applied thereon, and the clear coating film further applied thereon can be simultaneously baked and cured. Generally, the baking can be carried our at a temperature within a range of from 110 to 180° C., and preferably within a range of from 120 to 160° C. with heating in order to provide the resulting cured coating film with a higher degree of crosslinking. When the heating temperature is less than 110° C., the curing may be insufficient. When the temperature is more than 180° C., the resulting coating film may be hardened and brittle. Time for heating can be appropriately determined depending on the above-defined temperature, for example, it may be within a range of from 10 to 60 minutes at a temperature within a range of from 120 to 160° C.

EXAMPLES

The present invention is further described hereinafter in detail with referring to the following Examples, to which the present invention is not limited. Herein, the term "part(s)" means "part(s) by weight" otherwise specifically stated.
Waterborne Intermediate Coating Composition Preparation Example 1

Preparation of Hydroxyl Group-Containing Acrylic Resin Emulsion

445 Parts of water and 5 parts of Newcol 293 (produced by Nippon Nyukazai Co., Ltd.) were added to a reaction vessel for producing a conventional acrylic resin emulsion, which equipped with a stirrer, a thermometer, a dropping funnel, a reflux condenser, a nitrogen-introducing tube, etc. The mixture was heated to 75° C. with stirring. A mixture of 24.6 parts of a monomer mixture listed in the following Table 1 or 2, 240 parts of water and 30 parts of Newcol 293 (produced by Nippon Nyukazai Co., Ltd.) was emulsified in a homogenizer to give a monomer pre-emulsion. The monomer pre-emulsion was added dropwise to the reaction vessel with stirring over 3 hours. During the dropwise addition of the monomer pre-emulsion, an aqueous solution of 1 part of APS (ammonium persulfate) as a polymerization initiator in 50 parts of water was added dropwise to the reaction vessel. The addition of the monomer pre-emulsion and the addition of the aqueous solution were evenly carried out and simultaneously completed. After completion of the dropwise addition of the monomer pre-emulsion, the reaction was continued for 1 hour at 80° C. The reaction mixture was cooled. Subsequently, an aqueous solution of 2 parts of dimethylaminoethanol in 20 parts of water was added thereto to give a hydroxyl group-containing acrylic resin emulsion (Em-A to Em-J) having 40.6% by weight of non-volatile content, wherein pH of the acrylic resin emulsion was adjusted to 7.2 with 30% aqueous solution of dimethylaminoethanol.

TABLE 1

Formulation of Monomer Mixture

| | Acrylic Resin Emulsion | | | | | |
|---|---|---|---|---|---|---|
| | Em-A | Em-B | Em-C | Em-D | Em-E | Em-F |
| MAA | 1.53 | 1.53 | 1.53 | 1.53 | 1.53 | 1.53 |
| HEA | 8.28 | 8.28 | 8.28 | 12.42 | 12.42 | 8.28 |
| St | 45 | 35 | 20 | 45 | 20 | 70 |
| NBA | 21.73 | 38.27 | 63.08 | 9.53 | 44.08 | 20.19 |
| EA | 23.45 | 16.92 | 7.11 | — | — | — |
| DC-1 | — | — | — | 31.52 | 21.97 | — |

TABLE 2

Formulation of Monomer Mixture

| | Acrylic Resin Emulsion | | | |
|---|---|---|---|---|
| | Em-G | Em-H | Em-I | Em-J |
| MAA | 1.53 | 1.53 | 1.53 | 1.53 |
| HEA | 8.28 | 12.42 | 8.28 | 8.28 |
| St | 45 | 20 | 35 | 45 |
| NBA | 3.34 | — | 3.24 | 38.38 |
| EA | — | — | 51.95 | — |
| DC-1 | — | 66.05 | — | — |
| EHA | 41.84 | — | — | 6.8 |

MAA: a methacrylic acid produced by NIPPON SHOKUBAI CO., LTD., under a product name of methacrylic acid.
HEA: 2-hydroxyethyl acrylate produced by KYOEISHA CHEMICAL Co., LTD., under a product name of LIGHT-ESTER HOA.
St: styrene produced by Mitsubishi Chemical Corporation under a product name of styrene monomer.
NBA: n-butyl acrylate produced by TOAGOSEI CO., LTD., under a product name of n-butyl acrylate.
EA: ethyl acrylate produced by TOAGOSEI CO., LTD., under a product name of ethyl acrylate.
DC-1: methyl ether of 2-hydroxylethyl methacrylate produced by Mitsubishi Chemical Corporation under a product name of DC-1.
EHA: 2-ethylhexyl acrylate produced by TOAGOSEI CO., LTD., under a product name of 2-ethylhexyl acrylate.

The acrylic resin emulsion prepared in the Preparation Example 1 (Em-A to Em-F) has a styrene content, a water-tolerance, a hexane-tolerance, a glass transition temperature (Tg), a hydroxyl value (OHV) and an acid value (AV), which are shown in the following Tables 3 and 4.

TABLE 3

| | Acrylic Resin Emulsion | | | | | |
|---|---|---|---|---|---|---|
| | Em-A | Em-B | Em-C | Em-D | Em-E | Em-F |
| Styrene Content (% by weight) | 45 | 35 | 20 | 45 | 20 | 70 |
| Water-tolerance (mL) | 1 | 1 | 1 | 2 | 2 | 1 |
| Hexane-tolerance (mL) | 20 | 20 | 20 | 10 | 10 | 40 |
| Glass Transition Temperature (Tg) | 13.13 | −4.14 | −26.46 | 10.56 | −24.17 | 44.19 |
| Hydroxyl Value (OHV) (mgKOH/g) | 40 | 40 | 40 | 60 | 60 | 60 |
| Acid Value (AV) (mgKOH/g) | 10 | 10 | 10 | 10 | 10 | 10 |

TABLE 4

| | Acrylic Resin Emulsion | | | |
|---|---|---|---|---|
| | Em-G | Em-H | Em-I | Em-J |
| Styrene Content (% by weight) | 45 | 20 | 35 | 45 |
| Water-tolerance (mL) | 0.1 | 6 | 1 | 1 |
| Hexane-tolerance (mL) | 20 | 25 | 4 | 30 |
| Glass Transition Temperature (Tg) | −8.09 | −18.06 | 10.55 | 1.09 |
| Hydroxyl Value (OHV) (mgKOH/g) | 40 | 60 | 40 | 40 |
| Acid Value (AV) (mgKOH/g) | 10 | 10 | 10 | 10 |

Styrene content (% by weight): Styrene content (% by weight) is a percentage of weight of styrene relative to total weight of the all solid contents of the acrylic resin emulsion prepared according to the Preparation Example 1.
Water-tolerance (mL): 0.5 g of the acrylic resin of the acrylic resin emulsion prepared according to the Preparation Example 1 was weighted as a sample in a beaker. 10 mL of acetone was added to the resin to prepare an acetone solution. Water was added dropwise to the acetone solution until the acetone solution was hazed. The added amount of water where the acetone solution was hazed is a water-tolerance (mL).

Hexane-tolerance (mL): 0.5 g of the acrylic resin of the acrylic resin emulsion prepared according to the Preparation Example 1 was weighted as a sample in a beaker. 10 mL of acetone was added to the resin to prepare an acetone solution. Hexane was added dropwise to the acetone solution until the acetone solution was hazed. The added amount of hexane where the acetone solution was hazed is a hexane-tolerance (mL).

A glass transition temperature (Tg), a hydroxyl value (OHV) and an acid value (AV) of the hydroxyl group-containing acrylic resin in the emulsion can be found and determined by measuring the resin. Alternatively, they can be determined by a calculation with the content of the unsaturated monomers. Herein, the acid value of the acrylic resin of the emulsion can be found and determined by a titration of the resin with potassium hydroxide wherein 1 g of the acrylic resin (in a solid content) as an acid component is neutralized with 0.1N potassium hydroxide (KOH). The acid value is the added amount of potassium hydroxide (in mg) for neutralizing the resin. The hydroxyl value and the glass transition temperature of the resin can be calculated with the content of the unsaturated monomers to be used for the preparation of the resin.

Preparation Example 2

Preparation of Hydroxyl Group-Containing Polyester Resin 25.6 Parts of isophthalic acid, 22.8 parts of phthalic anhydride, 5.6 parts of adipic acid, 19.3 parts of trimethylolpropane, 26.7 parts of neopentyl glycol, 17.5 parts of ε-caprolactone and 0.1 part of dibutyltin oxide were added to a reaction vessel. The mixture was heated to 170° C. with stirring. The mixture was heated to 220° C. over 3 hours. Water produced by the condensation reaction was removed to give a reaction product having an acid value of 8. Subsequently, 7.9 parts of trimellitic anhydride was added to the reaction product. The reaction was carried out at 150° C. for 1 hour to give a polyester resin having an acid value of 40. The polyester resin was cooled to 100° C. 11.2 Parts of butyl cellosolve was added to the resin. The mixture was stirred to give a homogenous mixture. The mixture was cooled to 60° C. 98.8 Parts of ion-exchanged water and 5.9 parts of dimethylethanolamine were added to the mixture to give a hydroxyl group-containing polyester resin having a solid content of 50% by weight, an acid value of 40 as a basis of the solid content, a hydroxyl value of 110 as a basis of the solid content, a number average molecular weight of 2870, and a glass transition temperature (Tg) of −3° C. The glass transition temperature (Tg) of the hydroxyl group-containing polyester resin was determined with a differential scanning calorimeter (DSC220C) produced by Seiko Instruments Inc. (SII) [under measuring conditions: 10 mg of a sample, 10° C./min of an elevation rate, −20 to 100° C. of a measuring temperature range].

Preparation Example 3

Preparation of Carbodiimide Compound

3930 Parts of 4,4-dicyclohexylmethanediisocyanate was reacted with 79 parts of 3-methyl-1-phenyl-2-phospholene-1-oxide as a carbodiimidation catalyst at 180° C. for 16 hours to give a carbodiimide compound having 4 carbodiimide groups per one molecule and the both terminals being isocyanate groups. 1296 Parts of polyethylene glycol monomethyl ether, wherein an average number of the oxyethylene/ethyleneoxy repeating units is 9, and 2 parts of dibutyltin dilaurate were added to the carbodiimide compound. The mixture was heated at 90° C. for 2 hours to give a carbodiimide compound having one terminal being an isocyanate group and the other terminal being a hydrophilic group. Subsequently, 3000 parts of GP-3000 (produced by Sanyo Chemical Industries, Ltd.), which was a glycerin derivative wherein an propyleneoxide chain containing 16.7 mol of propyleneoxides in an average was attached to each of 3 hydroxyl groups of the glycerin, was added to the carbodiimide compound. The mixture was reacted at 90° C. for 6 hours. It was confirmed by IR that the reaction product had no isocyanate groups. 18800 Parts of deionized water was added to the reaction product, and then the mixture was stirred to give a water dispersion of the carbodiimide compound having a solid resin content of 30% by weight.

Preparation Example 4

Preparation of Pigment Dispersed Paste 4.5 Parts of a commercially available dispersing agent under a product name of "Disperbyk 190", which was an anionic-nonionic dispersing agent produced by BYK, 0.5 part of an anti-foaming agent under a product name of "BYK-011", which was an anti-foaming agent produced by BYK, 22.9 parts of ion-exchanged water, and 72.1 parts of titanium dioxide having a rutile structure as a pigment were preliminary mixed. The mixture and glass bead media were added to a paint conditioner. The pigment was dispersed in the mixture at a room temperature to give a pigment dispersed paste wherein the dispersed pigment had a particle size of no more than 5 μm.

Preparation Example 5

Preparation of Waterborne Intermediate Coating Composition 24.6 Parts of the hydroxyl group-containing acrylic resin emulsion (Em-A) prepared in the Preparation Example 1, 99.9 parts of the hydroxyl group-containing polyester resin prepared in the Preparation Example 2, 37.5 parts of a curing agent which was an imino type melamine resin produced by Mitsui Cytec Industries Inc., under a product name of Cymel 211, 33.3 parts of the carbodiimide compound prepared in the Preparation Example 3, and 139 parts of the pigment dispersed paste prepared in the Preparation Example 4 were mixed. Subsequently, 3.33 parts of an urethane associative thickener produced by ADEKA CORPORATION (effective ingredient content: 30%) under a product name of Adekanol UH-814N was added to the mixture. The mixture was stirred to give a waterborne intermediate coating composition.

Example 1

Production of Multilayer Coating Film

A dull steel panel treated with zinc phosphate was subjected to an electrodeposition coating with a cationic electrodeposition coating composition produced by NIPPON PAINT, CO., LTD., under a product name of POWERNICS 110, wherein the coating composition was applied so that the dried coating film therewith had a thickness of 20 μm, and then the applied coating composition was heated and cured at 160° C. for 30 minutes, and then cooled to give a steel panel substrate having an electrodeposited coating film.

On thus prepared substrate, the waterborne intermediate coating composition prepared in the Preparation Example 5 was applied with an air spraying to give an intermediate coating film having a thickness of 20 μm, and then the intermediate coating film was pre-heated at 80° C. for 5 minutes. On the pre-heated intermediate coating film, a metallic color waterborne base coating composition produced by NIPPON PAINT, CO., LTD., under a product name of AQUAREX AR-2000 silver metallic was applied with an air spraying to give a base coating film having a thickness of 10 μm, and then the base coating film was pre-heated at 80° C. for 3 minutes. Subsequently, on the pre-heated base coating film, a clear coating composition (in an acid-epoxy curing system) produced by NIPPON PAINT CO., LTD., under a product name of MACFLOW O-1800 W-2 CLEAR was applied with an air spraying to give a clear coating film having a thickness of 35 μm. Thus coated panel was subjected to heating and curing carried out at 140° C. for 30 minutes to give a test panel having a multilayer coating film.

The multilayer coating film was visually observed and evaluated on its finished exterior appearance according to the following evaluation basis. The evaluation results are shown in the following Tables. Herein, the waterborne intermediate coating composition, the waterborne base coating composition and the clear coating composition had been respectively diluted and applied under the following conditions.

Waterborne Intermediate Coating Composition
    Thinner: ion-exchanged water
    Viscosity: 40 (seconds) (No. 4 Ford Cup at 20° C.)
    Solid content of the composition: 54% by weight Waterborne Base Coating Composition
    Thinner: ion-exchanged water
    Viscosity: 45 (seconds) (No. 4 Ford Cup at 20° C.)

Clear Coating Composition
    Thinner: a mixed solvent of EEP (ethoxy ethyl propionate) and an aromatic hydrocarbon solvent produced by EXXON under a product name of S-150 (in a weight ratio of 1/1)
    Viscosity: 30 (seconds) (No. 4 Ford Cup at 20° C.)

Examples 2-5 and Comparative Examples 1-6

Waterborne intermediate coating compositions were prepared according to the formulations, i.e., components and amounts listed in the following Tables 5-7. Multilayer coating films were formed according to the Example 1 (as following Examples 2-5 and Comparative Examples 1-10). Evaluation results are also shown in the following Tables 5-7.

TABLE 5

|  | Ex. 1 | Ex. 2 | Ex. 3 | Ex. 4 | Ex. 5 |
| --- | --- | --- | --- | --- | --- |
| Waterborne Intermediate Coating Composition | | | | | |
| Acrylic Resin Emulsion (parts by weight) | Em-A (24.6) | Em-B (24.6) | Em-D (24.6) | Em-A (12.3) | Em-A (24.6) |
| Polyester Resin (parts by weight) | Prep. Ex. 2 (99.9) | Prep. Ex. 2 (99.9) | Prep. Ex. 2 (99.9) | Prep. Ex. 2 (109.8) | Prep. Ex. 2 (99.9) |
| Melamine Resin (parts by weight) | C-211 (37.5) | C-211 (37.5) | C-211 (37.5) | C-211 (37.5) | C-211 (37.5) |
| Carbodiimide (parts by weight) | Prep. Ex. 3 (33.3) | Prep. Ex. 3 (33.3) | Prep. Ex. 3 (33.3) | Prep. Ex. 3 (33.3) | Prep. Ex. 3 (33.3) |
| Thickener (parts by weight) | A (3.33) | A (3.33) | A (3.33) | A (3.33) | A (3.33) |
| NV | 50 | 50 | 50 | 50 | 50 |
| TI Value | 4.0 | 4.0 | 4.0 | 3.5 | 4.0 |
| Sagging | | | | | |
| Length (mm) | 3 | 3 | 3 | 5 | 5 |
| Evaluation | A | A | A | B | B |
| Storage Stability 40° C., 10 days | A | A | A | A | A |

TABLE 6

|  | Comp. Ex. 1 | Comp. Ex. 2 | Comp. Ex. 3 | Comp. Ex. 4 | Comp. Ex. 5 |
| --- | --- | --- | --- | --- | --- |
| Waterborne Intermediate Coating Composition | | | | | |
| Acrylic Resin Emulsion (parts by weight) | Em-C (24.6) | Em-E (24.6) | Em-A (4.92) | Em-A (24.6) | Em-A (24.6) |
| Polyester Resin (parts by weight) | Prep. Ex. 2 (99.9) | Prep. Ex. 2 (99.9) | Prep. Ex. 2 (116.1) | Prep. Ex. 2 (99.9) | Prep. Ex. 2 (99.9) |
| Melamine Resin (parts by weight) | C-211 (37.5) | C-211 (37.5) | C-211 (37.5) | C-211 (37.5) | C-211 (37.5) |
| Carbodiimide (parts by weight) | Prep. Ex. 3 (33.3) | Prep. Ex. 3 (33.3) | Prep. Ex. 3 (33.3) | Prep. Ex. 3 (33.3) | Prep. Ex. 3 (33.3) |

TABLE 6-continued

|  | Comp. Ex. 1 | Comp. Ex. 2 | Comp. Ex. 3 | Comp. Ex. 4 | Comp. Ex. 5 |
|---|---|---|---|---|---|
| Thickener (parts by weight) | A (3.33) | A (3.33) | A (3.33) | A (0.030) | B (3.33) |
| NV | 50 | 50 | 50 | 50 | 50 |
| TI Value | 2.0 | 1.5 | 2.0 | 2.0 | 1.5 |
| Sagging |  |  |  |  |  |
| Length (mm) | 6 | 10 | 6 | 6 | 12 |
| Evaluation | C | D | C | C | D |
| Storage Stability 40° C., 10 days | A | B | A | A | B |

TABLE 7

|  | Comp. Ex. 6 | Comp. Ex. 7 | Comp. Ex. 8 | Comp. Ex. 9 | Comp. Ex. 10 |
|---|---|---|---|---|---|
| Waterborne Intermediate Coating Composition | | | | | |
| Acrylic Resin Emulsion (parts by weight) | Em-F (24.6) | Em-G (24.6) | Em-H (24.6) | Em-I (24.6) | Em-J (24.6) |
| Polyester Resin (parts by weight) | Prep. Ex. 2 (99.9) | Prep. Ex. 2 (99.9) | Prep. Ex. 2 (99.9) | Prep. Ex. 2 (99.9) | Prep. Ex. 2 (99.9) |
| Melamine Resin (parts by weight) | C-211 (37.5) | C-211 (37.5) | C-211 (37.5) | C-211 (37.5) | C-211 (37.5) |
| Carbodiimide (parts by weight) | Prep. Ex. 3 (33.3) | Prep. Ex. 3 (33.3) | Prep. Ex. 3 (33.3) | Prep. Ex. 3 (33.3) | Prep. Ex. 3 (33.3) |
| Thickener (parts by weight) | A (3.33) | A (3.33) | A (3.33) | A (3.33) | A (3.33) |
| NV | —* | —* | 50 | 50 | —* |
| TI Value | —* | —* | 1.1 | 1.1 | —* |
| Sagging |  |  |  |  |  |
| Length (mm) | —* | —* | 20 | 20 | —* |
| Evaluation | —* | —* | D | D | —* |
| Storage Stability 40° C., 10 days | —* | —* | C | C | —* |

C-211: an imino type melamine resin produced by Mitsui Cytec Industries Inc., under a product name of Cymel 211.
Thickener A: an urethane associative thickener (effective ingredient amount: 30%) produced by ADEKA CORPORATION under a product name of Adekanol UH-814N.
Thickener B: an alkaline swelling thickener produced by SAN NOPCO LIMITED under a product name of Thickener SN-1.
NV: a percentage (in % by weight) of weight of non-volatile content relative to total weight of the waterborne intermediate coating composition.
TI value: a ratio of viscosity measured at 6 rpm relative to viscosity measured at 60 rpm by a B-type viscometer produced by TOKI SANGYO CO., LTD., under a product name of VISCOMETER TVB-10 (6 rpm/60 rpm).
*represents that the resulting waterborne intermediate coating composition is unstable and unsuitable to a coating composition.

C-211: an imino type melamine resin produced by Mitsui Cytec Industries Inc., under a product name of Cymel 211.

Thickener A: an urethane associative thickener (effective ingredient amount: 30%) produced by ADEKA CORPORATION under a product name of Adekanol UH-814N.

Thickener B: an alkaline swelling thickener produced by SAN NOPCO LIMITED under a product name of Thickener SN-1.

NV: a percentage (in % by weight) of weight of non-volatile content relative to total weight of the waterborne intermediate coating composition.

TI value: a ratio of viscosity measured at 6 rpm relative to viscosity measured at 60 rpm by a B-type viscometer produced by TOKI SANGYO CO., LTD., under a product name of VISCOMETER TVB-10 (6 rpm/60 rpm).

* represents that the resulting waterborne intermediate coating composition is unstable and unsuitable to a coating composition.

Evaluation of Sagging

The waterborne intermediate coating composition was applied to a panel having a hole with a diameter of 10 mm under the following robot-coating conditions wherein the panel was perpendicularly set. Subsequently, the applied coating composition on the panel was heated and cured with remaining the panel set perpendicularly. Sagging of the applied coating composition, which was formed at the bottom edge of the hole, was evaluated on its length (i.e., sagging length from the bottom edge of the hole).

Robot Coating Conditions

Temperature: 22° C.
　Humidity: 78%
Machine: ABB Cartridge Bell
　Linear coating rate: 600 mm/s
　Rotation rate: 25000 rpm
　Shaving air pressure: 1.5 kg/cm$^3$
　Applied voltage: −90 KV
　Thickness of the applied coating composition: 35 μm
　Setting period: 2 minutes
　Pre-heating: 5 minutes at 80° C.
　Heating and curing: 30 minutes at 140° C.

Evaluation Basis of Sagging
  A: sagging length within a range of from 0 to 3 mm
  B: sagging length within a range of from 4 to 5 mm
  C: sagging length within a range of from 6 to 8 mm
  D: sagging length no less than 9 mm
Evaluation of Storage Stability
  The diluted coating composition was left at 40° C. for 10 days. The resulting precipitates were visually observed.
  A: No precipitates
  B: Soft precipitates which can be dissolved with stirring
  C: Hard precipitates which can not be dissolved with stirring Application of the waterborne intermediate coating composition prepared according to the present invention to the three coating and one baking (3C1B) coating procedure could significantly suppress the sagging of the coating composition to give a multilayer coating film having an excellent exterior appearance as demonstrated in the Examples 1 to 5 of the present invention. Furthermore, the present invention could provide the waterborne intermediate coating composition with an excellent storage stability.

All of the Comparative Examples 1 to 10 could not significantly suppress the sagging of the coating composition. It is specifically stated as follows.

The Comparative Example 1 could not significantly suppress the sagging of the coating composition, wherein the acrylic resin emulsion Em-C was used. The styrene monomer content in the acrylic resin emulsion Em-C was deviated from the scope defined in the present invention.

The Comparative Example 2 could not suppress the sagging of the coating composition at all, wherein the acrylic resin emulsion Em-E was used. The styrene monomer content in the acrylic resin emulsion Em-E was deviated from the scope defined in the present invention. In addition, the storage stability of the coating composition was decreased.

Although the Comparative Example 3 employed the acrylic resin emulsion Em-A which was also used in the Example 1 of the present invention, the longer sagging length of the applied coating composition was observed due to the smaller amount of the emulsion Em-A in the comparative Example 3.

Although the Comparative Example 4 employed the acrylic resin emulsion Em-A which was also used in the Example 1 of the present invention, the longer sagging length of the applied coating composition was observed due to the smaller amount of the thickener A in the Comparative Example 4.

Although the Comparative Example 5 employed the acrylic resin emulsion Em-A which was also used in the Example 1 of the present invention, the Comparative Example 5 employed the thickener B, an alkaline-swelling thickener instead of the associative thickener A. Therefore, the much longer sagging length and the decreased storage stability were resulted in the Comparative Example 5.

The Comparative Example 6 employed the acrylic resin emulsion Em-F. The acrylic resin emulsion Em-F had 70% by weight of the styrene monomer content and 40 (mL) of the hexane-tolerance, both of which were deviated from those defined in the present invention. It was found that the resulting waterborne intermediate coating composition in the Comparative Example 6 was unstable and unsuitable as a coating composition.

The Comparative Example 7 employed the acrylic resin emulsion Em-G having 0.1 (mL) of water-tolerance. The Comparative Example 8 employed the acrylic resin emulsion Em-H having 6 (mL) of water-tolerance. Each water-tolerance was deviated from the scope defined in the present invention. An effective waterborne intermediate coating composition could not be obtained in the Comparative Example 7. The much longer sagging length and the significantly decreased storage stability were observed in the Comparative Example 8.

The Comparative Example 9 employed the acrylic resin emulsion Em-I having 4 (mL) of hexane-tolerance. The Comparative Example 10 employed the acrylic resin emulsion Em-J having 30 (mL) of hexane-tolerance. Each hexane-tolerance was deviated from the scope defined in the present invention. The much longer sagging length and the significantly decreased storage stability were observed in the Comparative Example 9. No effective waterborne intermediate coating composition could not be obtained in the Comparative Example 10.

INDUSTRIAL APPLICABILITY

According to the present invention, in a three coating and one baking (3C1B) coating procedure, the waterborne intermediate coating composition to form an intermediate coating film comprises the above-described specific hydroxyl group-containing acrylic resin emulsion, the hydroxyl group-containing polyester resin, the melamine resin, the carbodiimide, and the above-described specific associative thickener, wherein the hydroxyl group-containing acrylic resin in the emulsion comprises a styrene monomer in an amount within a range of from 27 to 65% by weight. The present invention can suppress sagging of the waterborne intermediate coating composition during the coating procedure, and provide a multilayer coating film with an excellent exterior appearance. Therefore, the present invention is particularly applicable to a coating of a vehicle body such as an automobile, etc. Furthermore, the present invention can be applied to the three coating and one baking (3C1B) coating procedure to omit some coating steps, save costs, and reduce loads on the environment.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those skilled in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for producing a multilayer coating film, which comprises the steps of
applying a waterborne intermediate coating composition on an electrodeposited coating film to form an intermediate coating film;
applying a waterborne base coating composition on the intermediate coating film to form a base coating film, wherein the waterborne base coating composition comprises a film forming resin selected from the group consisting of a polyester resin and an acrylic resin;
applying a clear coating composition on the base coating film to form a clear coating film, wherein the clear coating composition comprises a film forming resin selected from the group consisting of an acrylic resin and a polyester resin; and
simultaneously baking and curing the intermediate coating film, the base coating film applied thereon, and the clear coating film further applied thereon in order to form a multilayer coating film,
wherein the waterborne intermediate coating composition comprises
an emulsion of a hydroxyl group-containing acrylic resin comprising 35 to 45% by weight of a styrene monomer, relative to total weight of monomers for preparation of the acrylic resin of the emulsion, wherein the emulsion has a water-tolerance within a range of from 0.2 to 5 and a hexane-tolerance within a range of from 5 to 25;
a hydroxyl group-containing polyester resin;
a melamine resin;
a carbodiimide; and
an associative thickener,
wherein the associative thickener comprises an urethane compound (A) represented by the formula (1), and an urethane compound (B) represented by the formula (2):

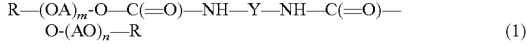

$$R-(OA)_m-O-C(=O)-NH-Y-NH-C(=O)-O-(AO)_n-R \quad (1)$$

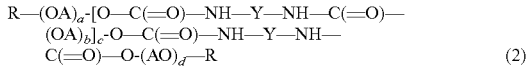

$$R-(OA)_a-[O-C(=O)-NH-Y-NH-C(=O)-(OA)_b]_c-O-C(=O)-NH-Y-NH-C(=O)-O-(AO)_d-R \quad (2)$$

wherein
R independently represents a hydrocarbon group having 8 to 24 carbon atoms,
Y independently represents a residue resulted from a removal of two isocyanate groups from a diisocyanate,
OA independently represents an oxyalkylene group having 2 to 4 carbon atoms,
AO independently represents an alkyleneoxy group having 2 to 4 carbon atoms,
O represents an oxygen atom,
C represents a carbon atom,
N represents a nitrogen atom,
m independently represents an integer of 20 to 500,
n independently represents an integer of 20 to 500,
a independently represents an integer of 1 to 100,
d independently represents an integer of 1 to 100,
b represents an integer of 40 to 500,
c represents an integer of 1 to 5,
b by c (or b×c) represents an integer of 150 to 2500, and
R may be the same or different, and Y may be the same or different,
wherein each of the urethane compounds (A) and (B) has at least 80% by weight of oxyethylene groups and ethyleneoxy groups relative to the total weight of the oxyalkylene groups and the alkyleneoxy groups,
wherein weight ratio of the hydroxyl group-containing acrylic resin emulsion to the associative thickener is within a range of from 100/0.1 to 100/50 as a basis of the solid content, and
wherein the waterborne intermediate coating composition comprises 3 to 25% by weight of the carbodiimide.

2. The method according to claim 1, wherein the weight ratio of the hydroxyl group-containing acrylic resin emulsion to the associative thickener is within a range of from 100/1 to 100/10 as a basis of the solid content.

3. The method according to claim 1, wherein the hydroxyl group-containing acrylic resin in the emulsion has a glass transition temperature (Tg) within a range of from −10 to 40° C., an acid value within a range of from 3 to 50 mgKOH/g, and a hydroxyl value within a range of from 5 to 80 mgKOH/g.

4. The method according to claim 1, wherein the waterborne intermediate coating composition comprises 5 to 70% by weight of the hydroxyl group-containing polyester resin, 1 to 30% by weight of the hydroxyl group-containing acrylic resin emulsion, 10 to 40% by weight of the melamine resin, and 0.05 to 2% by weight of the associative thickener.

5. The method according to claim 2, wherein the hydroxyl group-containing acrylic resin in the emulsion has a glass transition temperature (Tg) within a range of from −10 to 40° C., an acid value within a range of from 3 to 50 mgKOH/g, and a hydroxyl value within a range of from 5 to 80 mgKOH/g.

6. The method according to claim 2, wherein the waterborne intermediate coating composition comprises 5 to 70% by weight of the hydroxyl group-containing polyester resin, 1 to 30% by weight of the hydroxyl group-containing acrylic resin emulsion, 10 to 40% by weight of the melamine resin, 3 to 25% by weight of the carbodiimide, and 0.05 to 2% by weight of the associative thickener.

7. The method according to claim 3, wherein the waterborne intermediate coating composition comprises 5 to 70% by weight of the hydroxyl group-containing polyester resin, 1 to 30% by weight of the hydroxyl group-containing acrylic resin emulsion, 10 to 40% by weight of the melamine resin, 3 to 25% by weight of the carbodiimide, and 0.05 to 2% by weight of the associative thickener.

* * * * *